(12) United States Patent
Karakash

(10) Patent No.: US 11,555,530 B1
(45) Date of Patent: Jan. 17, 2023

(54) CINCHING CONNECTOR APPARATUS, SYSTEM AND METHOD FOR ATTACHING A LINE TO A FUNCTIONAL SHEET PRODUCT

(71) Applicant: John Karakash, Harford, PA (US)

(72) Inventor: John Karakash, Harford, PA (US)

(*) Notice: Subject to any disclaimer, the term of this patent is extended or adjusted under 35 U.S.C. 154(b) by 0 days.

(21) Appl. No.: 17/737,090

(22) Filed: May 5, 2022

(51) Int. Cl.
*F16G 11/14* (2006.01)

(52) U.S. Cl.
CPC .................. *F16G 11/14* (2013.01)

(58) Field of Classification Search
CPC ....... A44C 5/0007; A61C 1/145; A61C 17/08; A61C 19/001; A61C 17/06; A61C 19/00; A61C 2201/00; A44D 2203/00; F16G 11/14
See application file for complete search history.

(56) References Cited

U.S. PATENT DOCUMENTS

| | | | | |
|---|---|---|---|---|
| 2,580,843 A * | 1/1952 | Sam | ........... | A43C 11/22 24/575.1 |
| 2,745,163 A * | 5/1956 | Buren, Jr. | ........... | A41F 11/04 24/265 R |
| 3,780,400 A * | 12/1973 | Hinsperger | ........... | A44B 1/185 D8/394 |
| 3,936,912 A * | 2/1976 | Flanagan, Jr. | ........... | E04H 15/64 24/481 |
| 4,038,727 A | 8/1977 | Robbins | | |
| 4,184,233 A | 1/1980 | Jacobson | | |
| 4,682,447 A | 7/1987 | Osborn | | |
| 4,686,748 A | 8/1987 | Kaivanto | | |
| 4,688,304 A | 8/1987 | Marcott | | |
| 5,074,014 A | 12/1991 | Freeman | | |
| D339,521 S | 9/1993 | Bartlett | | |
| 5,867,873 A | 2/1999 | Arend | | |
| 6,108,837 A | 8/2000 | Knebel | | |
| 6,148,488 A | 11/2000 | Gristock | | |
| 6,292,987 B1 | 9/2001 | Combes | | |
| 6,473,944 B1 * | 11/2002 | Vazin | ........... | F16G 11/14 24/712.9 |
| D572,117 S | 7/2008 | Daun | | |
| 7,406,753 B1 | 8/2008 | LaScala | | |
| 7,784,158 B2 | 8/2010 | Doyle | | |

(Continued)

OTHER PUBLICATIONS

Tektron 6268 tarp clips, Amazon, accessed Jan. 12, 2022, https://www.amazon.com/TEKTON-6268-Tarp-Clips-4-Piece/dp/B00A50NB24.

(Continued)

*Primary Examiner* — David M Upchurch
(74) *Attorney, Agent, or Firm* — Robert J. Yarbrough

(57) ABSTRACT

A cinching connector to attach a functional sheet product to a line comprises a waist member, a buckle, and a cord. The cord engages the buckle to create an adjustable loop. One side of the functional sheet product is draped over the waist member and the adjustable loop placed over the other side of the functional sheet product and over the waist member. The adjustable loop is moved from an expanded circumference to a cinched circumference by tension applied to the cord, cinching the adjustable loop and the functional sheet product to a waist of the waist member. Tension on the line holds the adjustable loop in the cinched circumference and maintains the attachment of the waist member to the functional sheet product.

21 Claims, 16 Drawing Sheets

(56) References Cited

U.S. PATENT DOCUMENTS

| | | | |
|---|---|---|---|
| 7,837,164 B1 | 11/2010 | Getgood | |
| 8,028,381 B2 | 10/2011 | Murray | |
| 8,650,725 B1 * | 2/2014 | Cooper | E04H 15/64 24/72.5 |
| 9,874,039 B2 * | 1/2018 | Haas | E04H 15/64 |
| D911,831 S * | 3/2021 | Sutliff, II | D8/394 |
| 2006/0170237 A1 | 8/2006 | McAuliffe | |
| 2017/0184140 A1 | 6/2017 | Giannatti | |

OTHER PUBLICATIONS

Zip-Up Products LLC, 'Gromm-it' Peel & Stick adhesive grommet, accessed Jan. 12, 2022, https://www.zipup.com/wp-content/uploads/2020/09/Peel-N-Stick-Grommet-Sell-Sheet.pdf.

"4 HD white E Z grommet tabs for Tarps, Tyvek & Cuben Fiber Sheets" eBay, accessed Jan. 12, 2022, https://www.ebay.com/itm/4-HD-white-E-Z-grommet-tabs-for-Tarps-Tyvek-Cuben-Fiber-sheets/261106223648.

"Which eyelets (grommets) are stronger?," Carr Group, Sydney, Australia, accessed Jan. 12, 2022, https://carrgroup.com.au/which-eyelets-grommets-are-stronger/.

"Tarp Tie Down," Amazon.com, accessed Jan. 11, 2022, https://www.amazon.com/stores/page/4C360004-591F-4036-B675-7BEAE533CAA6?ingress-2&visitId-9a042b6b-7e35-4c84-8066-09a46903d0b5&ref_-ast_bln.

* cited by examiner

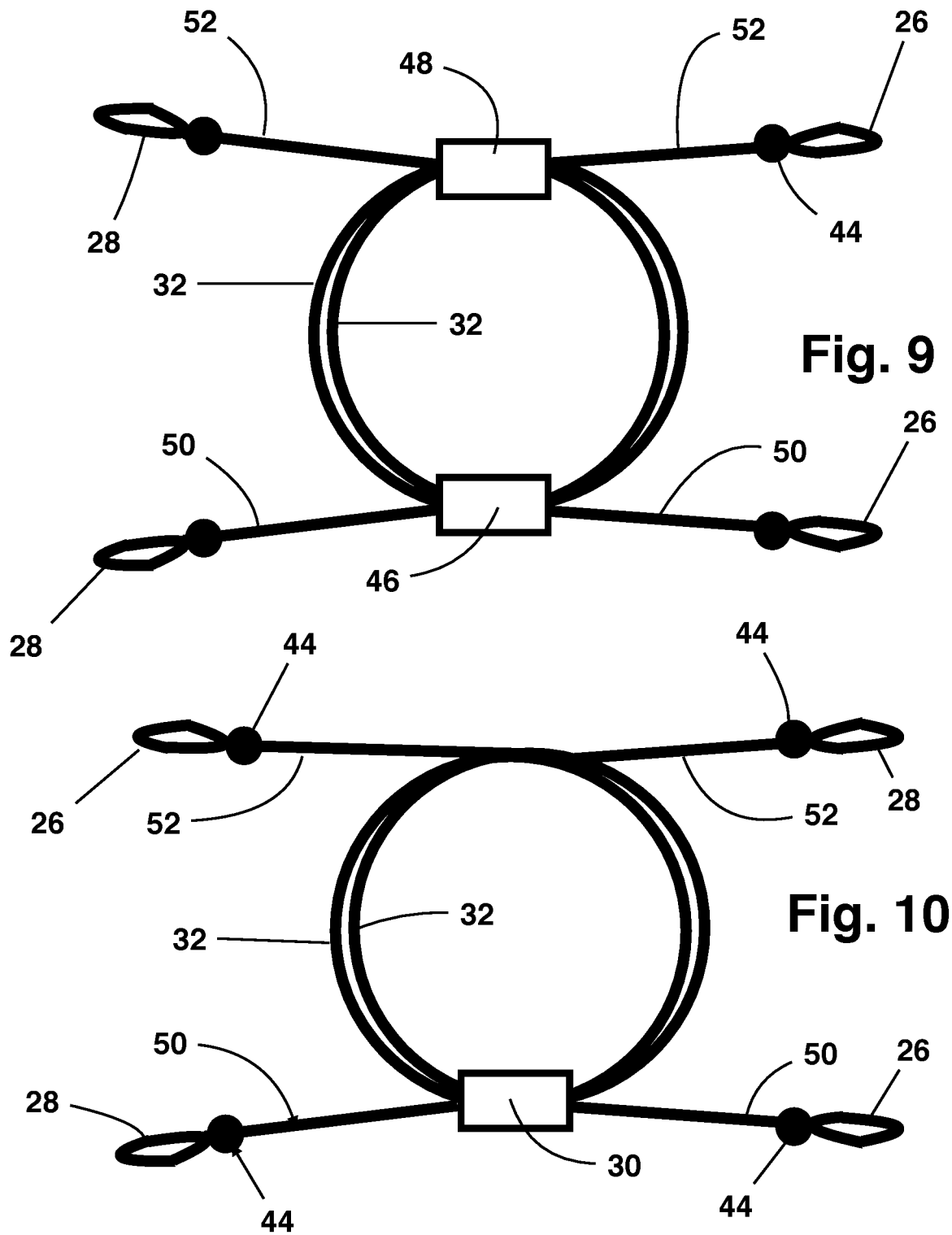

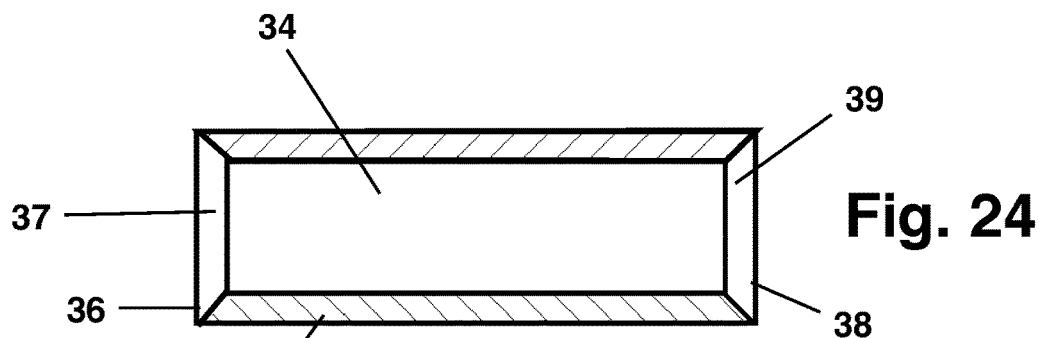
Fig. 24
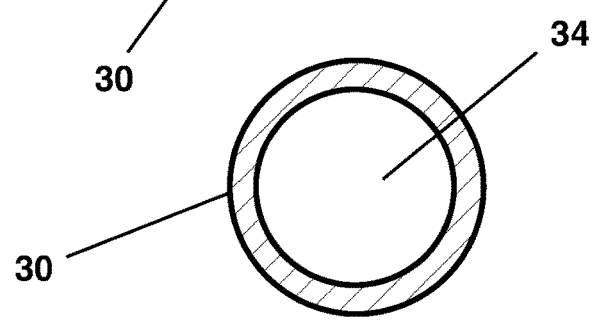
Fig. 25
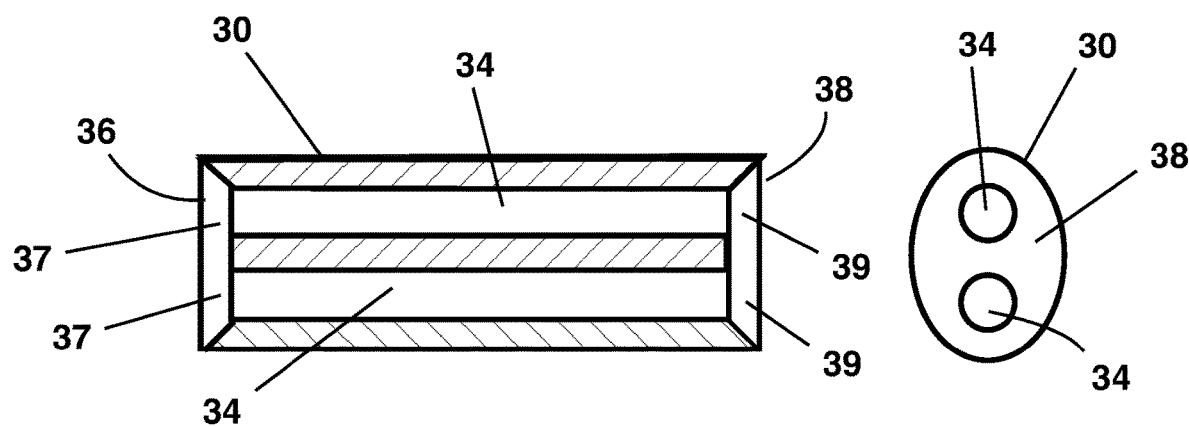
Fig. 26
Fig. 27

CINCHING CONNECTOR APPARATUS, SYSTEM AND METHOD FOR ATTACHING A LINE TO A FUNCTIONAL SHEET PRODUCT

I. BACKGROUND OF THE INVENTION

A. Field of the Invention

The Invention relates to the connection of a line to a functional sheet product such as a tarpaulin, greenhouse flexible plastic film covering material, or furniture blanket pad in a manner that is removable and relocatable without puncturing the functional sheet product.

As used in this document, the term 'line' means a rope, string, wire, cable, polymer monofilament, chain, bar linkage, ratchet strap, bungie cord, or any other apparatus capable of supporting a load along its length only under tension.

As used in this document, the term "functional sheet product" means any flexible woven or non-woven sheet material that is thin compared to its length and width. To serve its intended purpose, the functional sheet product may be placed in a prearranged position by a user and retained in that position by tensioned lines or by any other suitable mechanism.

B. Statement of the Related Art

Functional sheet products are widely used in applications that cover surface areas for a range of purposes, such as providing some type of protection, restraining movement or preventing unwanted release of a covered object or material. Specific examples include ground covers beneath commodity storage piles reducing infusion of surface water and providing material containment, as a top cover limiting scratch or impact damage to furniture being transported, wrap covers preventing further economic loss to buildings or vehicles that had been subject to accident or violent storms, retarding undesirable escape of granular products or light debris material from stockpiles, open topped containers or transport vehicles, as a form-fitting construction commodity used to build special-use facilities such as greenhouses, and for temporary barriers to airflow and harmful dust as in asbestos mitigation projects.

Functional sheet products may be produced as a single layer or a plurality of homogenous or heterogenous layers quilted together. Functional sheet products may be fabrics woven from natural or synthetic fibers as from strands of a natural or a synthetic fiber, such as cotton or polyethylene. Woven functional sheet products such as tarpaulins may be coated by a water-resistant material, such as wax, tar or polyvinyl chloride The functional sheet products may be composed of a synthetic sheet, as in a sheet of a calendared polymer such as polyvinyl chloride or polyethylene.

Functional sheet products usually are held in place by lines attached to or surrounding the prepositioned sheet. The lines generally are maintained under tension. Lines may be attached to the functional sheet product at a grommet, at an adhesive fastener, or at a clamping fastener.

The utility value of each attachment method varies widely and measurably, when considering an application's effectiveness, simplicity of successful attachment, whether the intended prearranged sheet product positioning and line tension will hold over time, and level of impact on the expected functional life of the sheet product.

Grommets are reinforced perforations through a functional sheet product communicating from one side of the functional sheet product to the other side of the functional sheet product. As an example of the use of grommet installed in a sheet material, see U.S. Patent Publication 2006/0170237 by McAuliffe published Aug. 3, 2006. A grommet comprises two halves, with each of the halves generally composed of brass, stainless steel, or plastic. The two halves are disposed on opposing sides of the functional sheet product. To install the grommet, the two halves are crushed together so that the two halves grip each other and grip the functional sheet product between the two halves. A grommet is a permanent addition, results in a hole through the functional sheet product, and cannot be repositioned after installation.

Grommets may be attached by adhesive to a functional sheet product. Such adhesive grommets generally comprise a conventional grommet attached to a sheet or a tab of a reinforcing fabric. The sheet of reinforcing fabric is adhesively attached to the functional sheet product and results in a permanent hole through the functional sheet product. An adhesive tab is fixed to the edge of the functional sheet product. Adhesive grommets are permanently attached and are not relocatable.

Clamping connectors may clamp to the edge of a functional sheet product, as in U.S. Patent Publication 2017/0184140 by Giannatti published Nov. 23, 2010 and U.S. Pat. No. 4,038,727 to Robbins issued Aug. 2, 1977. Such connectors are generally applied to the edge of the functional sheet product and have limited functionality if clamped to surface points away from an edge.

A functional sheet product connector may use a wedge, cylinder, disk or objects with other shapes on one side of the functional sheet product and a mating wedge, cylinder or clip disposed on the opposite side of the functional sheet product. For mating wedges, see U.S. Design Pat. No. D572,117 to Daun, U.S. Pat. No. 4,686,748 to Kaivanto issued Aug. 17, 1987, and U.S. Pat. No. 7,406,753 to LaScala issued Aug. 5, 2008. For mating cylinders, see U.S. Pat. No. 6,292,987 to Combes issued Sep. 25, 2001. For a disk or other shape mating with a clip, see U.S. Pat. No. 7,784,158 to Doyle issued Aug. 31, 2010, U.S. Pat. No. 6,108,837 to Knebel issued Aug. 29, 2000, U.S. Pat. No. 5,867,873 to Arend issued Feb. 9, 1999, U.S. Pat. No. 5,074,014 to Freeman issued Dec. 24, 1991, U.S. Pat. No. 4,688,304 to Marcott issued Aug. 25, 1987.

The prior art does not teach the functional sheet product connection apparatus, system or method of the invention.

II. BRIEF DESCRIPTION OF THE INVENTION

The Invention is a cinching connector apparatus, system and method for attaching one or more lines to a functional sheet product so that the lines may apply tension between a point on the sheet product and a second point located either separate from or at a second position on the sheet product.

The attachment point(s) may be anywhere on the sheet product. The Invention allows a user to readily change the position of the attachment point on the functional sheet product. The Invention will attach to a wide variety of functional sheet product type compositions, thicknesses and numbers of layers. The Invention may be applied and removed without creating holes in the functional sheet product. The cinching connector reduces point ripping stress associated with traditional methods of line connection. The Invention enables weather resistant connections that increase the area protected by the functional sheet product by combining multiple functional sheet products.

The apparatus of the cinching connector comprises a waist member, a cord and a buckle. In use, components of the Invention are arranged in engagement with the functional sheet product so as to trap and tightly hold a selected portion of the functional sheet product between a circular loop of the cord and the waist member. The trapped functional sheet product is fixed in position with respect to the cord and waist member, allowing the cord to apply tension to the functional sheet product.

The waist member may have a member first end, an opposing member second end, and a waist between the member first and second ends. The circumference of the waist is less than the circumference of each of the member first end and member second end. The general shape of the waist member may resemble a dumbbell or doorknob. The body of the waist member may be composed of a natural or synthetic rigid or semi-resilient material such as polymer or cellulose.

Both the first and second ends of the waist member may be rounded, without pointed corners or sharp edges to reduce the likelihood that the waist member will cause punctures or abrasive damage to the functional sheet product during or after the connection process. The waist member first end and second end may be shaped to directly engage with edges or sharp corners intrinsic to a covered object so as to prevent damage to the functional sheet product from abrasion or punctures from direct contact with the covered object.

The waist member may include features for engagement with supplemental components, which may serve as a structural supporting framework for the sheet product such as vertically or horizontally oriented poles or other structural members. The waist member may define a longitudinal axis from the member first end to the member second end. The first end may be divided into a left portion and a right portion by a mathematical plane coincident with the longitudinal axis. The two portions may be hinged at the second end so that the left and right portions open and close in the manner of a clamshell. The waist member may define a lateral opening penetrating through the waist member and having a lateral opening axis that is coincident with the mathematical plane. The lateral opening may be sized to accept a pole and may be generally normal to the waist member longitudinal axis. The opening may be located proximal to the hinge.

The second end of the waist member may define a second end longitudinal pole opening, with the second end longitudinal pole opening aligned with the longitudinal axis of the waist member. The second end longitudinal pole opening may be configured to receive a longitudinal pole, for example, a tent pole, to support the waist member and hence the functional sheet product above the ground. The longitudinal pole may be inserted into the second end longitudinal pole opening either before or after the waist member is attached to the functional sheet product by the adjustable loop.

Both the first and second ends of the waist member may be rounded so that the functional sheet product may be wrapped about either the member first end or the member second end and attached to the waist of the waist member by the cord. The first end may define a first end longitudinal pole opening and the second end may define a second end longitudinal pole opening, with both the first end and second end longitudinal pole openings aligned with the longitudinal axis of the waist member.

The member first end and member second end longitudinal pole openings may be sized or otherwise configured to receive longitudinal poles having different diameters, shapes or connection structures. A member first end or member second end pole opening may be threaded to receive a longitudinal pole having corresponding threads. Alternatively, the member first end or member second end longitudinal pole opening may have other structure to receive and to retain a longitudinal pole having corresponding structure. For example, the longitudinal pole may be tapered or may have a bayonet connection and the member first end or member second end may be configured to engage the taper or the bayonet connection. Alternatively, the longitudinal pole or the member first end or member second end may include a spring latch or detent to maintain the pole in engagement with the member first or member second end. Any other structure to maintain the pole in engagement with the first or second end is contemplated by the Invention.

As an alternative, the waist member may be of any shape and may dispense with the waist. For example, the waist member may be a retaining member that is generally spherical.

The cord is elongated and extends between a first, or cord leading end and an opposing cord second end. In use the cord defines an adjustable loop intermediate to the first cord end and cord second end. The cord may be a rope, string or cable composed of wire, natural or synthetic fibers or extruded polymer. The cord may be flexible while adequately stiff to maintain an adjustable loop of generally circular shape when in use.

The cord leading end may terminate in a line connector such as a simple loop to which a line may be attached to apply tension to the cord. Alternatively, the cord leading end and the line may be one and the same. The cord second end may terminate in a stop. The stop prevents the cord second end from being pulled through the buckle channel, described below, when tension is applied to the cord leading end. As an alternative, both the cord leading end and cord second end may terminate in a loop or other line connector so that lines may apply tension to the cord from both the leading end and the second end in two generally opposing directions. Both the leading end and the second end may have a stop to prevent unintended passage of the cord first end or cord second end through the buckle channel. As another alternative, the cord second end may be affixed to the buckle so that the cord second end does not slide with respect to the buckle. The cord may be coated, as with a polymer sleeve, for purposes including appearance, cord protection and enhancement of friction between the cord and the buckle as the cord slidably engages the buckle.

The buckle has a buckle body that is generally tubular. The buckle body has a buckle entry end and an opposing buckle exit end. At least one buckle channel, which is a hollow passage, communicates through the buckle body from a buckle entry opening on the buckle entry end to a buckle exit opening on the buckle exit end.

The cord is disposed along a path that extends from the cord second end to the cord leading end. From the cord second end, the path of the cord extends through the buckle entry opening on the buckle entry end and through the channel penetrating the buckle. The path of the cord exits the channel through the buckle exit opening and extends from the buckle exit opening back to the buckle entry opening to form an adjustable loop. The path of the cord again passes through the buckle entry opening on the buckle entry end and through the channel. The path of the cord then passes through the buckle exit opening on the buckle exit end and terminates at the cord leading end. While the above describes the path as 'passing' or 'extending' in a specific direction, the cord slideably penetrates the buckle through the channel and may slide in either direction.

The adjustable loop is generally circular. The cord slideably engages the channel of the buckle so that the circumference of the loop is adjustable. Movement of the cord leading end through the channel in one direction causes the adjustable loop to expand in circumference, allowing the loop to be easily placed over and around the first or second end of the waist member. Movement of the cord leading end through the buckle in the opposite direction may cause the adjustable loop to contract in circumference and may draw the adjustable loop to a reduced circumference that is less than the circumference of the first or second end of the waist member and that will not readily pass over either end of the waist member.

In the method of using the combination of the cord, the buckle and the waist member to secure a line to a functional sheet product, there are five steps, the first of which is preparatory to any connection or reconnection:

1) The initial step is confirming that the Invention's components are arranged relative to each other assuring that two conditions necessary for easy installation are met. The adjustable loop is expanded to a circumference adequate for easy placement over and around either end of the waist member, and secondly, that the extended length of the cord second end from the buckle cord entry end opening is short, with the cord second end stop in close proximity with the buckle body.

2) Second, at the chosen point of connection the user will engage the intended end of the waist member with one side of the functional sheet product, effectively draping the sheet product over the length of the waist member.

3) The third step of the method is that from the other side of the functional sheet product the user will place the adjustable loop about the functional sheet product-draped waist of the waist member.

4) The fourth step is that the user will tighten the adjustable loop. This is accomplished by drawing tension on the cord leading end while holding the buckle body and the adjustable loop in position about the waist of the waist member. The tension pulls cord through the buckle reducing the circumference of the adjustable loop about the waist, ultimately defining the closed cinch attachment position.

5) The fifth step is that the user may attach the cord leading end to a line and establish the desired level of tension in the preferred direction.

In the method of using an alternate form of the invention employing a hinged clamshell waist member, the user will undertake the following actions before draping the functional sheet product about the waist member (step 2, above):

1) The user will open the waist member at the hinge and will place a lateral support pole in the opening.

2) The user will close the left and right portions of the waist member about the hinge. The waist member may retain the lateral support pole within the lateral opening.

3) Thereafter, as above, the user attaches the functional sheet product to the first end of the waist member using the cord and buckle, retaining the lateral support pole between the opposing left and right portions of the waist member, and retaining the functional sheet product between the circular cord loop and the closed waist member.

In the method of using a generally spherical retaining member rather than the waist member, tension applied to the cord leading end, the cord second end, or to both the cord first and second ends moves the adjustable loop to the cinched circumference below the second end of the retaining member. The adjustable loop of this alternative embodiment is wrapped tightly about a neck formed from the functional sheet product without the additional dimension of the waist of a waist member. The cinched circumference is less than the circumference of the retaining member, trapping the functional sheet product between the retaining member and the cinched cord loop. Tension on the line(s) maintains the adjustable loop in the cinched circumference.

Steady tension maintained from the line to the cord leading end, applied through the buckle around the functional sheet product-draped waist member with the adjustable cord loop in the cinched condition prevents re-expansion of the adjustable cord loop, unwanted movement of the sheet product, and release of any lateral pole held by the hinged waist member.

As a first alternative form to a cord having a line connector on only the cord leading end and a stop on the cord second end, the cord may include line connectors on both the cord first end and the cord second end and a separate line attached to each cord end. As a result, the cord may draw tension on the waist member, and hence on the functional sheet product, in two directions. The line connector may be a loop to which a line may be tied and may be any other connection between the cord leading end or the cord second end and a line, including a block, a pulley, a clamp, a latch, a magnet, a hook, a knot, or any other mechanism to connect the line to the cord leading end. As an alternative, a line may define the cord leading end or the cord second end.

As a second alternative form, two separate cords may extend about a single waist member to define two adjustable loops with a common center disposed about the waist of the waist member. Each of the cords may have a first and a second line connector, for a total of up to four ends. Each of the four ends may apply tension to the functional sheet product in a different direction, for a total of four different directions. The described two separate cords may both pass either through a single, bifurcated single, or through two separate buckles.

As a third alternative form, the buckle may be permanently anchored to the cord second end so that second end does not move with respect to the buckle. The cord of this third alternative can apply tension to the waist of the waist member and hence to the functional sheet product in only one direction.

As a fourth alternative form, a second line connector may itself define the buckle and buckle channel with the cord leading end making only a single transit through the buckle channel. The cord of this fourth alternative can apply tension to the waist member in only one direction.

In the method of using the Invention, the user may change the point of connection after having initially attached a line by following the installation steps described above in reverse order, as follows:

a. First, the user releases the line from the cord leading end.

b. Second, the user slides the cord leading end back through the buckle exit end opening while holding the buckle body stationary. This increases the circular cord loop circumference, relaxing cinching tension.

c. The user continues expanding the circular loop circumference until the circular loop may be lifted free from functional sheet product-draped waist member.

d. The user then repositions said waist member, and reconnects the functional sheet product by following the connection steps described above.

III. BRIEF DESCRIPTION OF THE DRAWINGS

FIG. 9 is a plan view of an alternative embodiment having two buckles and two cords to apply tension in four directions.

FIG. 10 is a plan view of an alternative embodiment having a single buckle and two cords to apply tension in four different directions.

Figure 16:
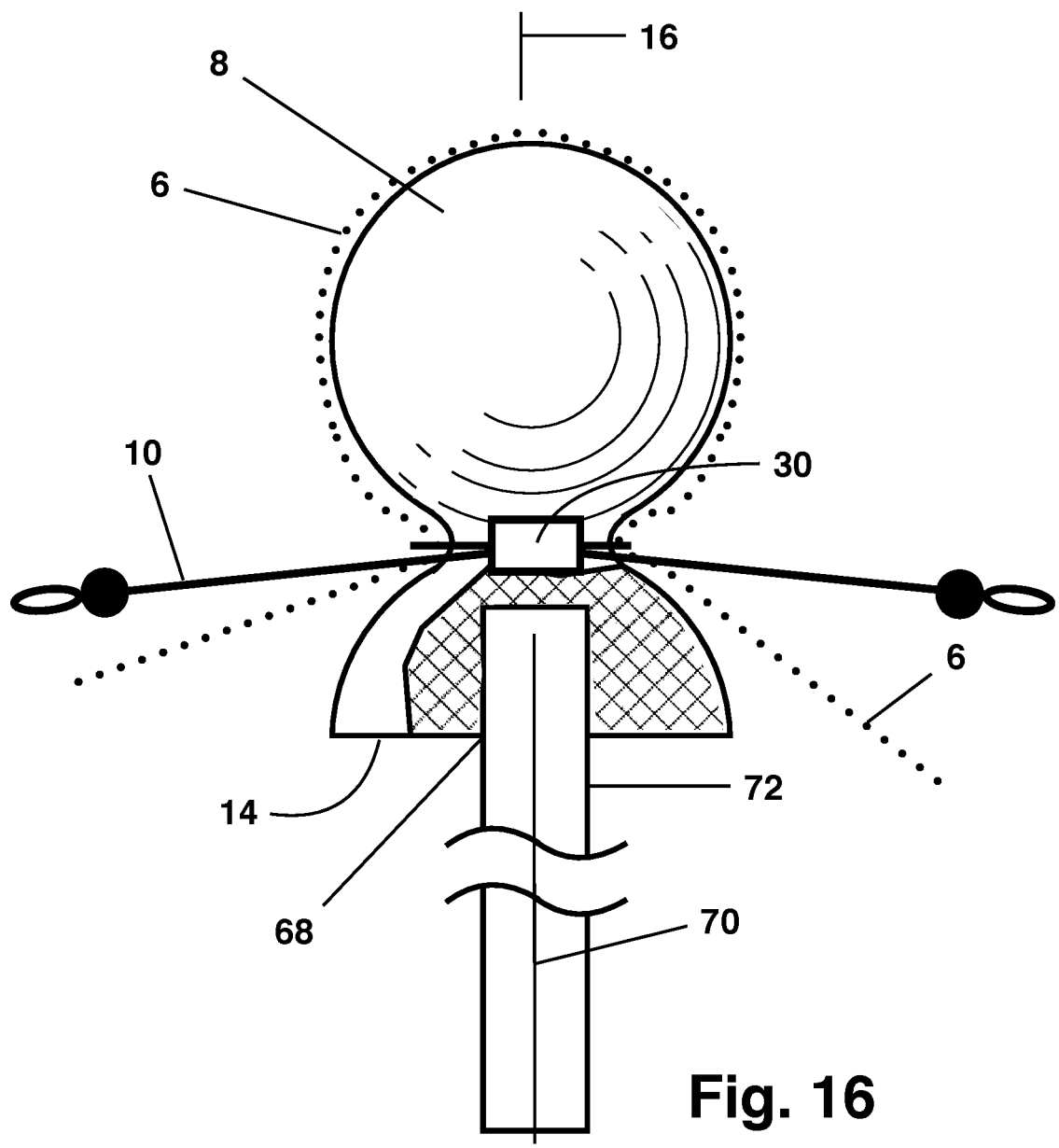

FIG. 16 us a partial cutaway side view of the waist member engaging a longitudinal support and supporting the functional sheet product.

Figure 17:
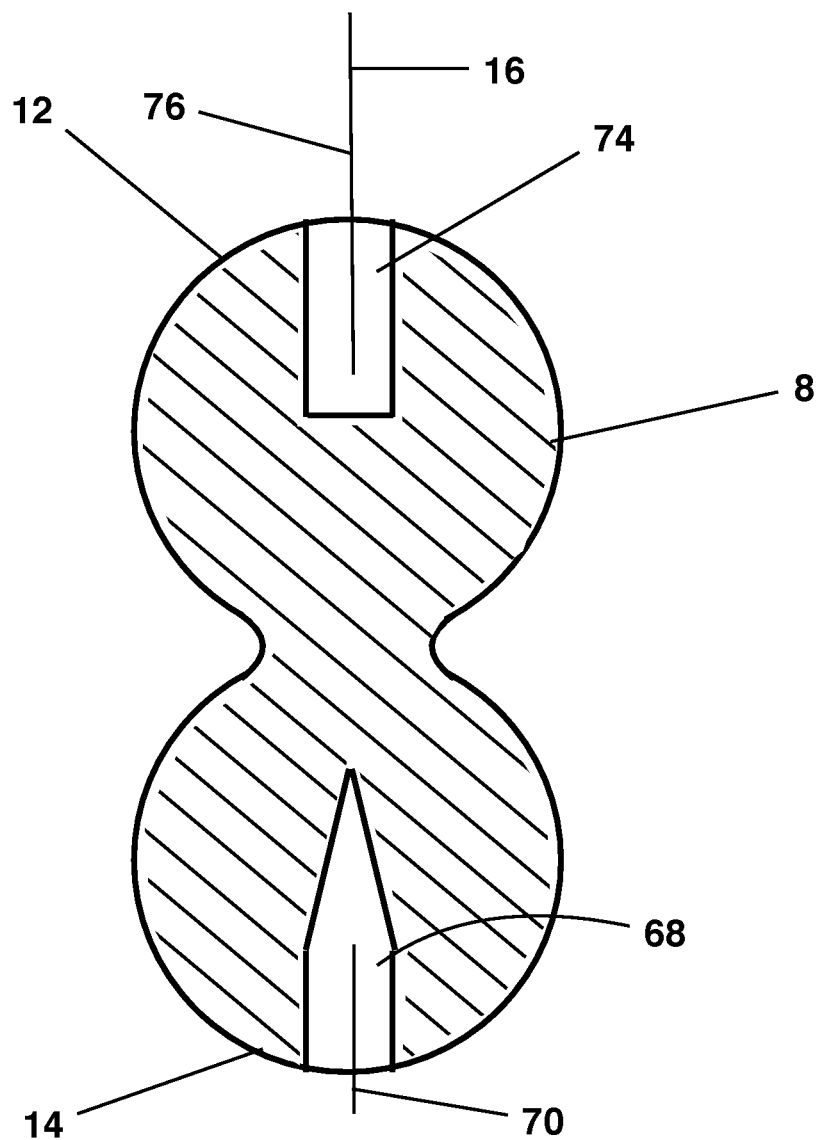

FIG. 17 is a section side view of the waist member configured to engage two different longitudinal supports.

Figure 1:
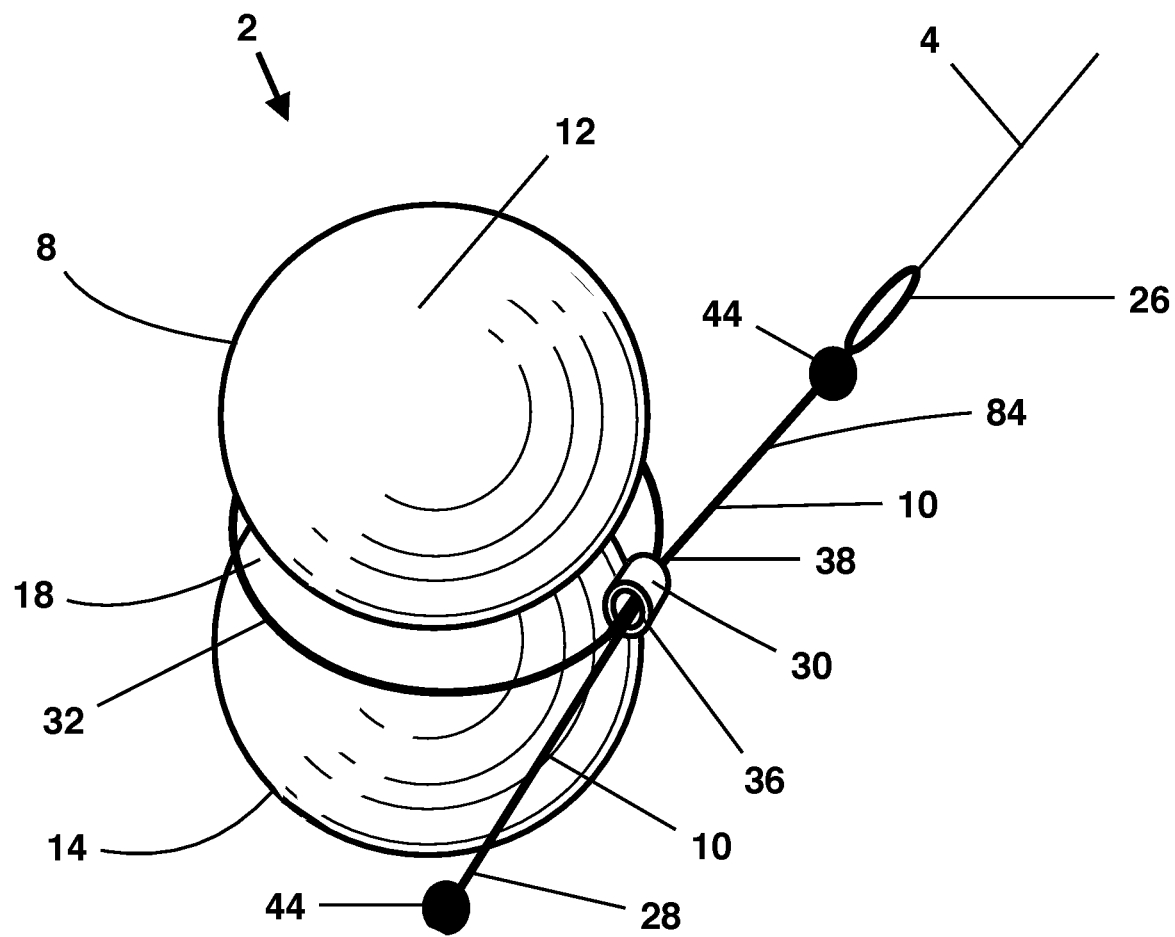
FIG. 1 is a perspective view of the waist member, cord and buckle of the Invention.
Figure 18:
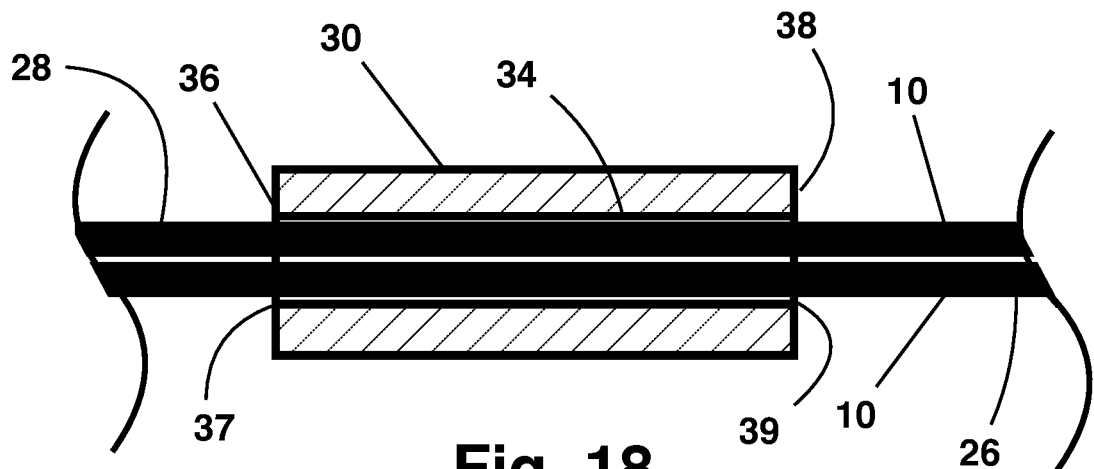

FIG. 18 is a detail section view of the buckle of FIG. 1.

Figure 19:
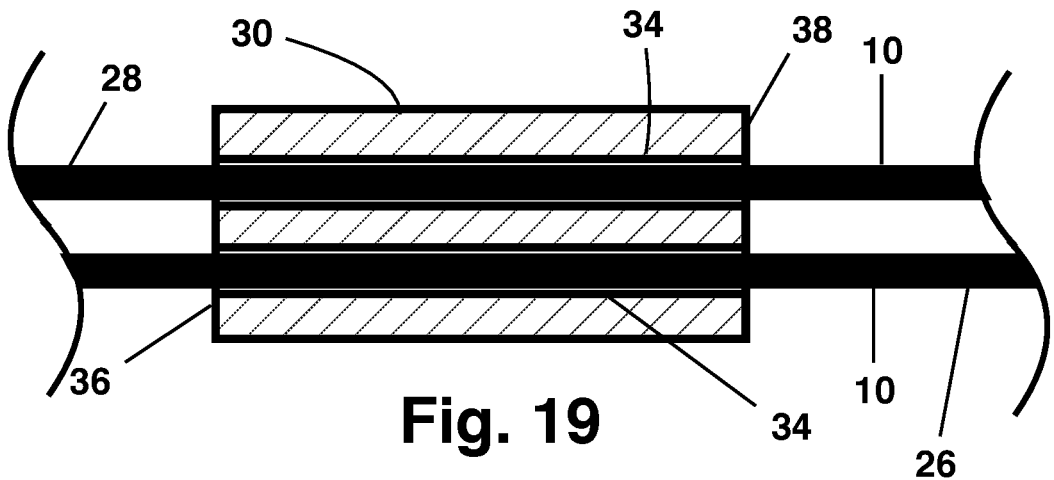

FIG. 19 is a detail section view of a buckle having two cord-receiving channels.

Figure 20:
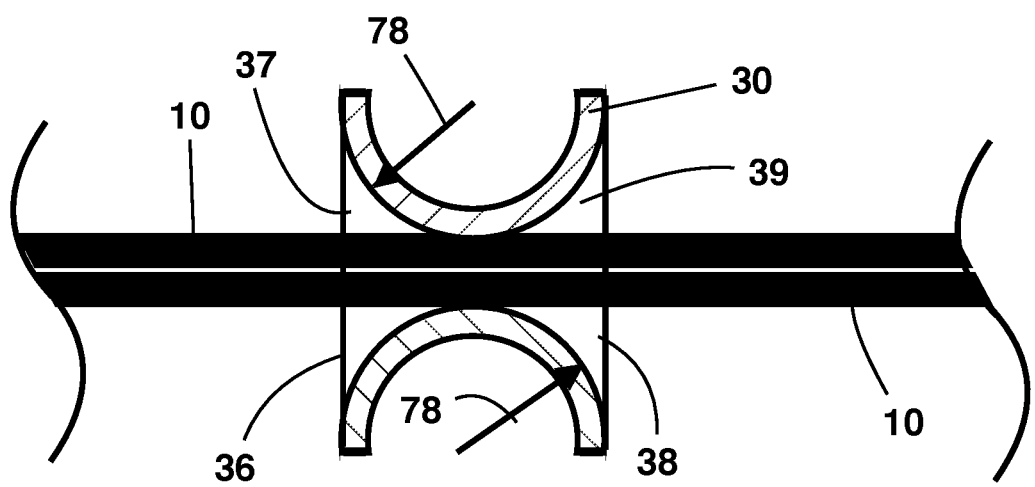

FIG. 20 is a detail section view of an alternative embodiment buckle having flared ends.

Figure 21:
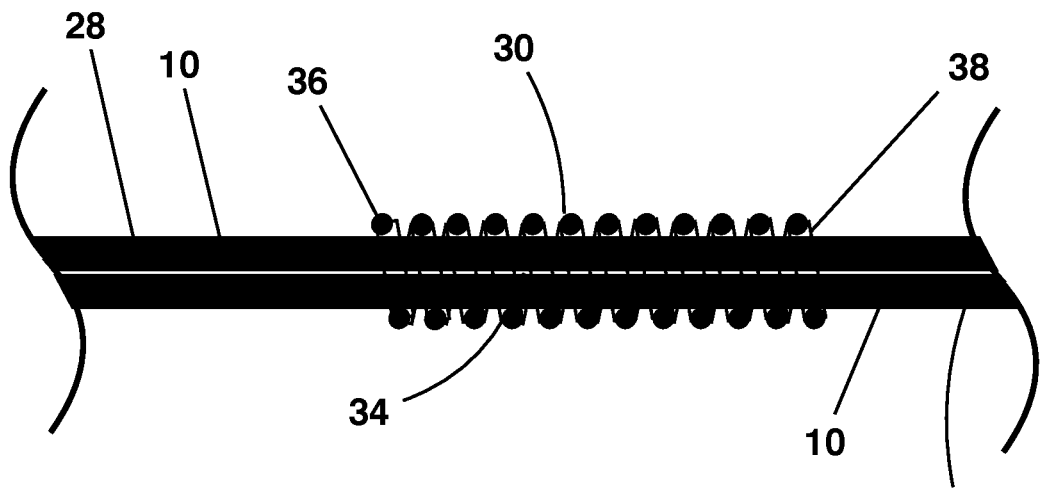

FIG. 21 is a detail section view of an alternative embodiment buckle comprising a coil spring.

Figure 22:
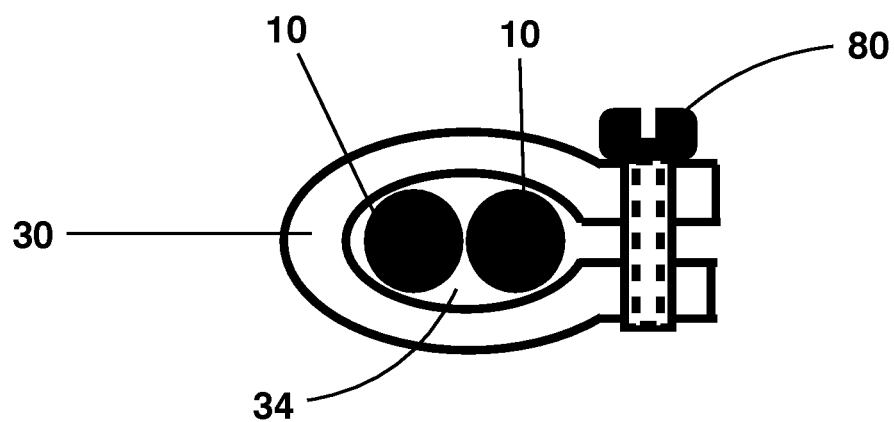

FIG. 22 is a section end view of a buckle having an adjustment screw.

Figure 23:
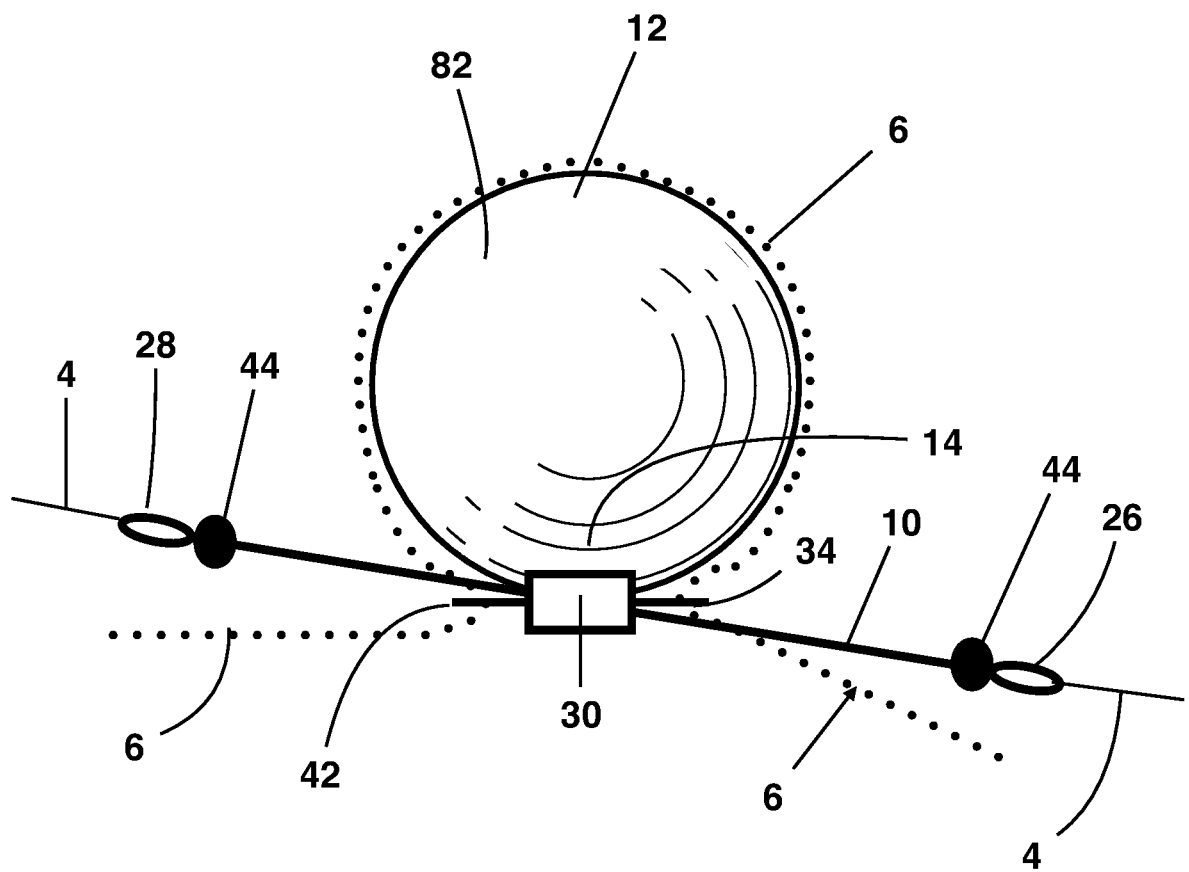

FIG. 23 is a side view of an alternative embodiment of the Invention using a retaining member.

FIG. 24 is a section side view of a buckle.

FIG. 25 is an end section view of the buckle of FIG. 24.

FIG. 26 is a section side view of a buckle having two channels.

FIG. 27 is an end view of the buckle of FIG. 26.

IV. DESCRIPTION OF AN EMBODIMENT

A cinching connector apparatus 2 selectably connects a line 4, such as a rope, twine, wire, cable, polymer monofilament, ratchet strap or bungie cord to a functional sheet product 6. The cinching connector 2 allows the line 4 to apply tension to the functional sheet product 6 to build a shelter, cover a load, or for any other purpose.

Figure 2:
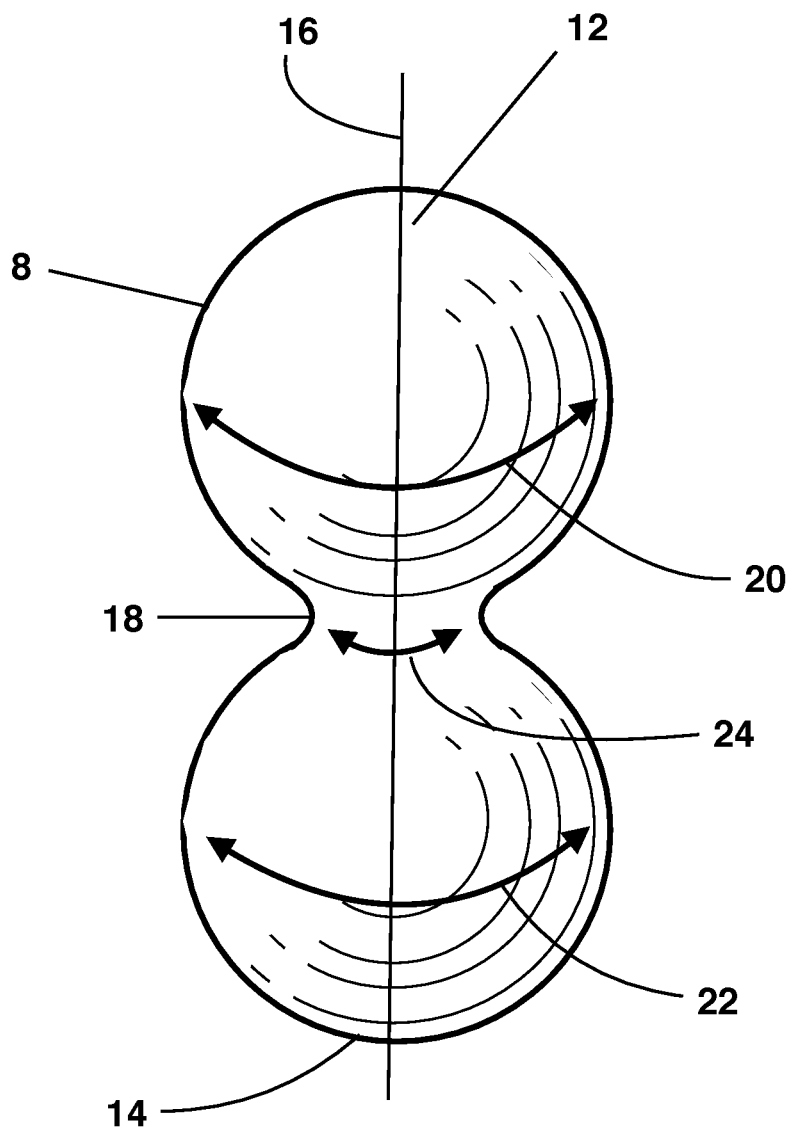
FIG. 2 is a side view of the waist member.

FIGS. 1 through 4 illustrate a first embodiment of the cinching connector 2. The cinching connector 2 comprises a waist member 8, a cord 10, and a buckle 30. FIG. 1 is a perspective view of the cinching connector 2. From FIG. 1, the waist member 6 includes a member first end 12 and an opposing member second end 14. FIG. 2 is a side view of the waist member 8. From FIG. 2, the waist member 6 has a waist member longitudinal axis 16 between the first and second ends 12, 14. The waist member 6 may have a waist 18 between the member first and second ends 12, 14. The member first end 12 has a member first end circumference 20 at the widest location on the member first end 12 and a member second end circumference 22 at the widest location on the member second end 14. The waist 18 has a waist circumference 18 at its narrowest location between the member first end circumference 20 and member second end circumference 22. The waist circumference 24 is less than the member first end circumference 20 and the member second end circumference 22.

Figure 3:
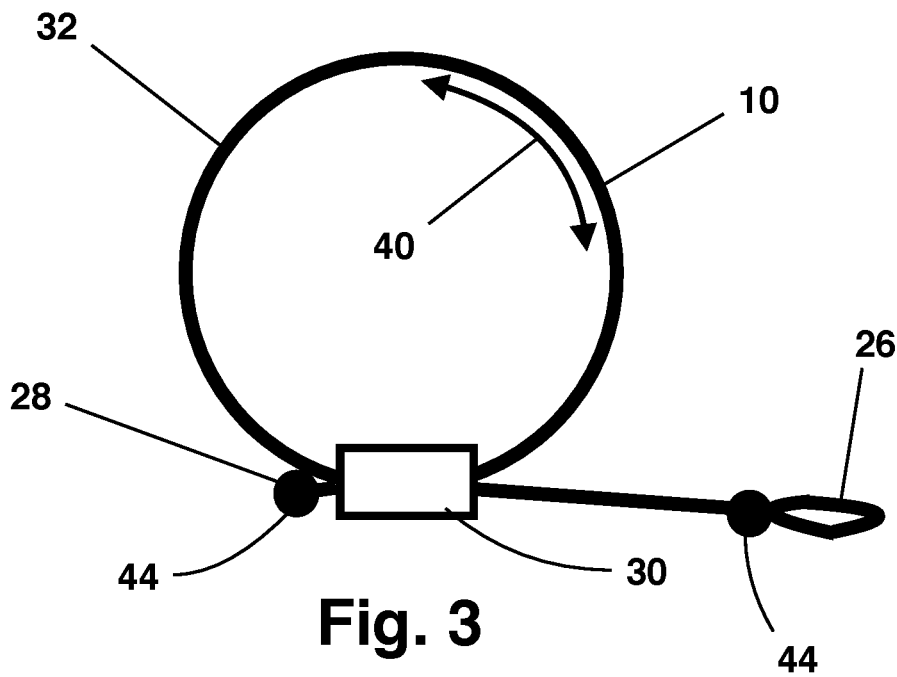
FIG. 3 is a plan view of the cord and buckle configured to apply tension in one direction.
Figure 4:
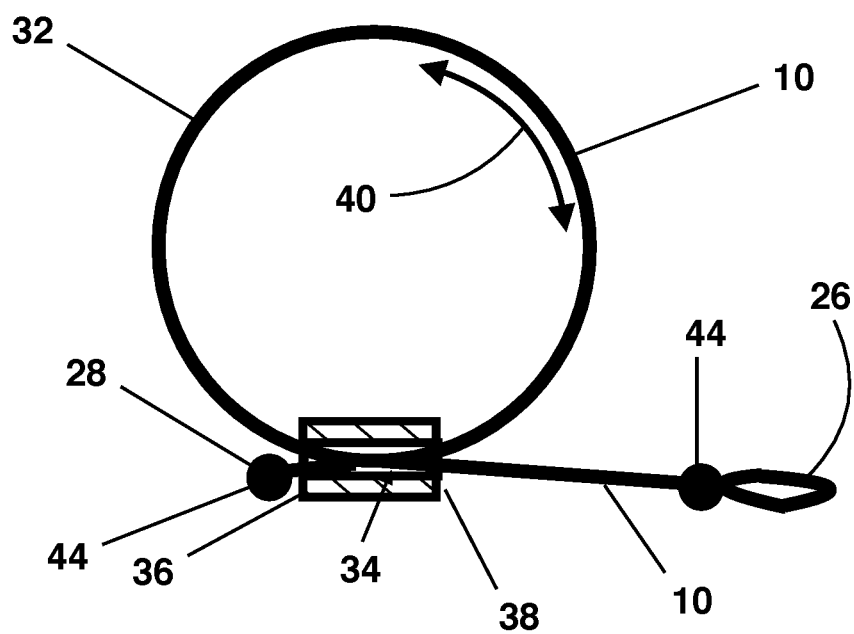
FIG. 4 is a section view of the buckle of FIG. 3.

FIGS. 3 and 4 are plan views of the cord 10 and buckle 30. From FIGS. 1, 3, and 4, the cord 10 has a cord leading end 26 and a cord second end 28. The cord leading end 26 may be configured to connect to a line 4. In the example of FIGS. 1, 3, and 4, the cord leading end 26 is a simple loop to which the line 4 may be tied. Any other connection between the cord leading end 26 and a line 4 is contemplated by the invention, including a block, a pulley, a clamp, a latch, a magnet, a hook, a knot, or any other mechanism to connect the line 4 to the cord leading end 26. The connection of the line 4 to the cord leading end 26 may be releasable or may be permanent. The line 4 may define the cord 10 and hence may be the same as the cord 10.

From FIGS. 1, 3, and 4, the cord 10 passes through and slideably engages a buckle 30 to define an adjustable loop 32. FIG. 4 is a section view of the buckle 30 and cord 10. FIGS. 18-22 and 24-27, discussed below, are detail views of alternative buckles 30 of FIGS. 1, 3 and 4. The buckle 30 has at least one buckle channel 34, which is a passage communicating through the buckle 30 from a buckle entry end 36 to an opposing buckle exit end 38. The buckle channel 34 has a buckle entry opening 37 on the buckle entry end 36 and a buckle exit opening 39 on the opposing buckle exit end 38. As shown by FIGS. 1, 3, 4 and 18-22, the elongated cord 10 extends from the cord second end 28 through the buckle entry opening 37, through the buckle channel 34, and out of the buckle exit opening 39. The cord 10 continues from the buckle exit opening 39 back to the buckle entry opening 37 to form the adjustable loop 32. The cord 10 extends from the adjustable loop 32 through the buckle entry opening 37, through the buckle channel 34, and out the buckle exit opening 39 to the cord leading end 26. The adjustable loop 32 is adjustable because the cord 10 may slidably engage the buckle channel 34.

The adjustable loop 32 shown by FIGS. 1, 3 and 4 has an expanded circumference 40. The expanded circumference 40 is greater than the waist member first end circumference 20 of FIG. 2 so that the adjustable loop 32 with the expanded circumference 40 will fit over the member first end 12 and the functional sheet product 6 when the functional sheet product 6 is draped over the member first end 12.

Figure 5:
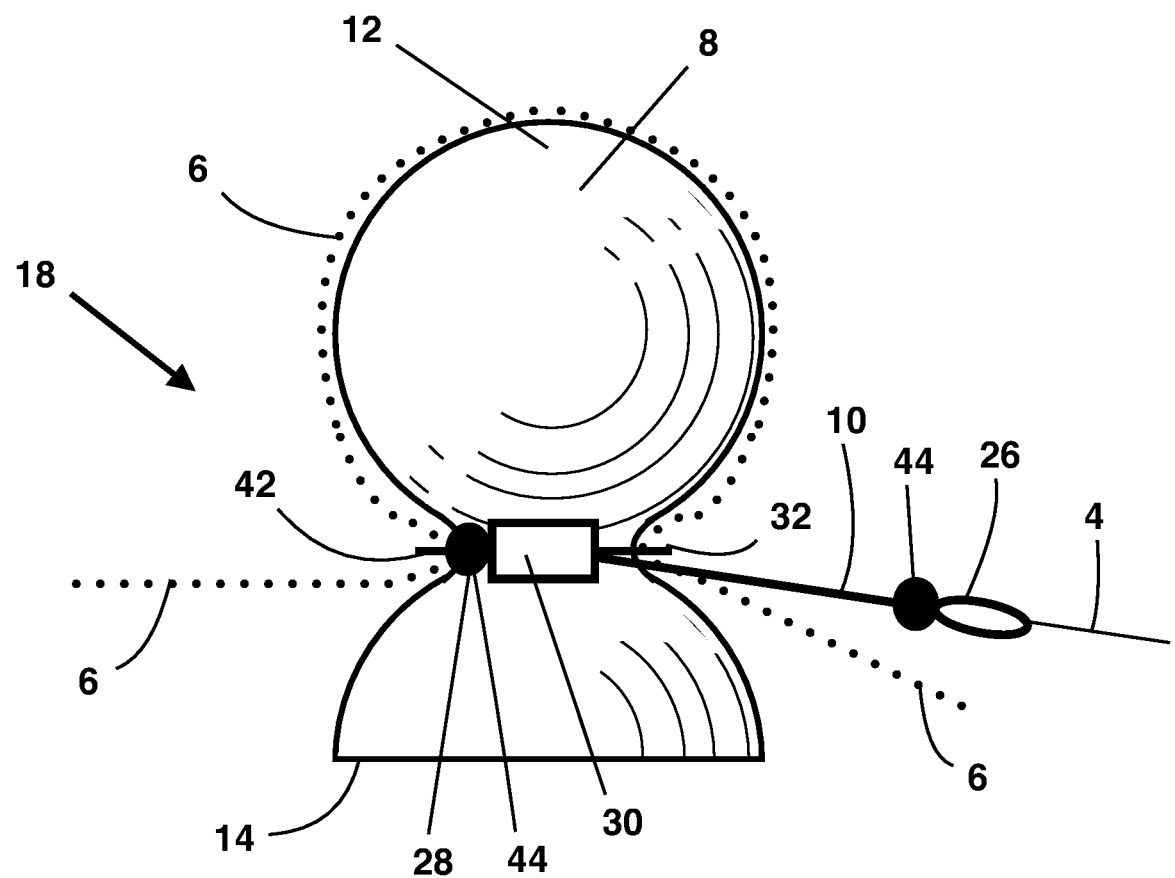
FIG. 5 is a side view of the cord and buckle of FIGS. 1-4 retaining a functional sheet product to a waist member and applying tension in one direction.

FIG. 5 shows the adjustable loop 32 with a cinched circumference 42 securing a functional sheet product 6 to the waist 18 of the waist member 8. The functional sheet product 6 is indicated by a dotted line on FIG. 5. To secure the line 4 to the functional sheet product 6, a user will drape the functional sheet product 6 over the first end 12 of the waist member 8. The user will place the adjustable loop 32 over the combination of the functional sheet product 6 and the member first end 12. The user applies tension to the cord leading end 26 causing the adjustable loop 32 to move from the expanded circumference 40 shown by FIGS. 1, 3 and 4 to the cinched circumference 42 shown by FIG. 5. Tension applied by the line 4 maintains the adjustable loop 32 in the cinched circumference 42.

As shown by FIGS. 1 and 3-5, each of the first and second ends 26, 28 may include a stop 44. A stop 44 attached to the cord leading end 26 prevents the cord leading end 26 from passing through the buckle exit opening 39. Another stop 44 attached to the cord second end 28 prevents the cord second end 28 from passing through the buckle entry opening 37. In the situation shown by FIGS. 1 and 3-5 where a stop 44 prevents movement of the cord second end 28 through the buckle entry opening 37, tension applied to the cord leading end 26 may pull the stop 44 attached to the cord second end 28 to the buckle 30 and may pull the cord 10 to the cinched position 42, retaining the cinching connector 2 on the functional sheet product 6.

To prevent damage to the functional sheet product 6, the member first end 12 is rounded, spherical or oblate and does not define an edge or acute angle that will touch the functional sheet product 6. In the example of FIG. 5, the member first end 12 and the member second end 14 are of different shapes and the member second end 14 defines an edge. Draping the functional sheet product 6 over the waist member 8 for the embodiment of FIG. 5 is limited to the member first end 12. For the embodiments of FIGS. 1 and 2, the member second end 14 does not define an edge and the waist member 8 is reversible—the functional sheet product 6 may be draped over and attached to either the member first end 12 or the member second end 14.

The cinching apparatus 2 is most successful when the cord 10 frictionally engages the buckle 30 and the cord 10 itself within the buckle channel 34 to provide some resistance to the movement of the adjustable loop 32 between the expanded circumference 40 and the cinched circumference 42. A cord 10 composed of a stranded wire cable coated in a polymer and passing through a buckle 30 composed of a metal or a polymer has proven suitable in practice. A cord 10 composed of a monofilament polymer passing through a buckle composed of polymer or metal also has proven suitable in practice. The friction of the polymer-coated stranded wire cable or the monofilament polymer in the buckle 30 prevents the adjustable loop 32 from moving from the cinched circumference 42 to the expanded circumference 40 when tension on the cable leading end 26 is released. The friction between the cord 10 and buckle 30 eases the task of installing and re-positioning the cinching connector apparatus 2. A user nonetheless may readily move the adjustable loop 32 from the expanded circumference 40 to the cinched circumference 42 by manually applying tension to the cable first end 26, and may readily reverse that motion by applying manual force to the adjustable loop 32 and buckle 30.

Figure 6:
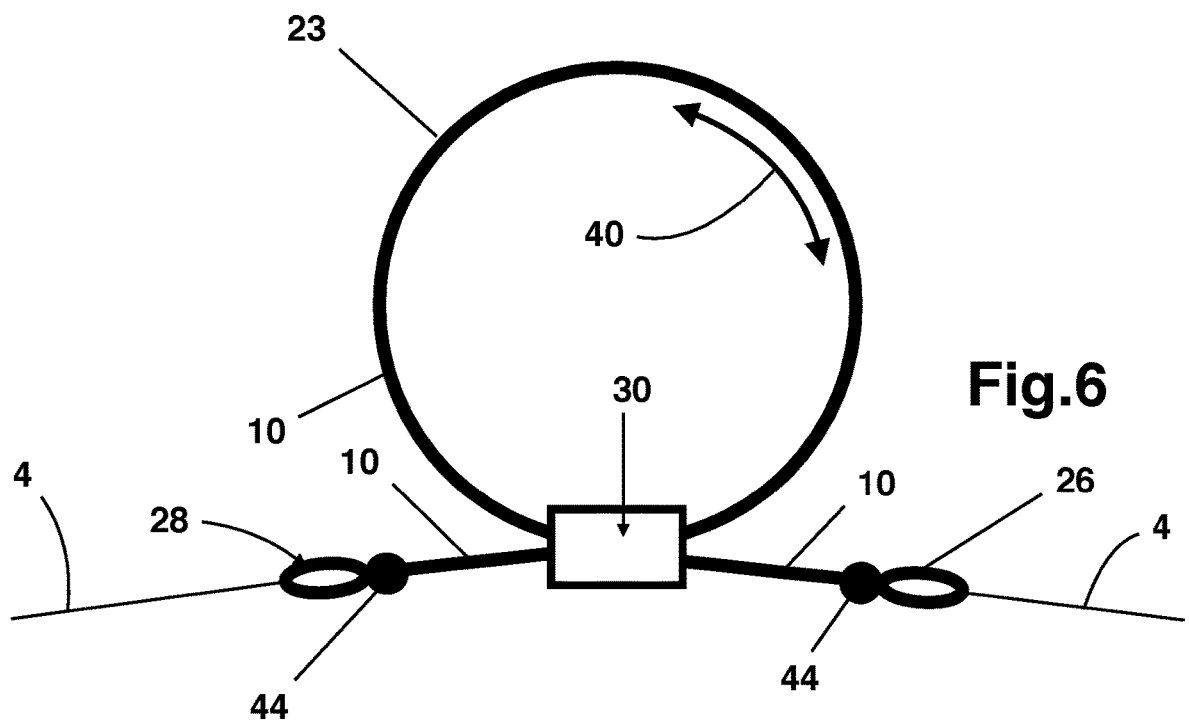
FIG. 6 is a plan view of the cord and buckle configured apply tension in two generally opposing directions.
Figure 8:
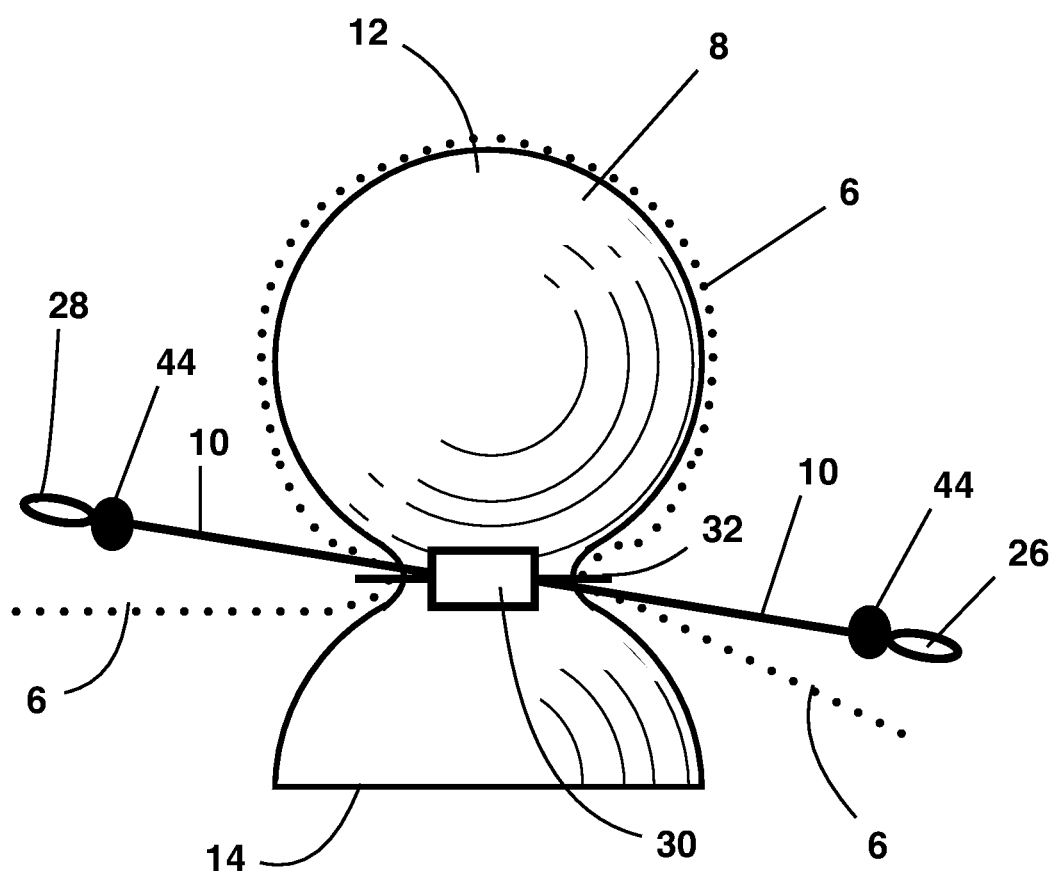
FIG. 8 is a side view of the cord and buckle of FIG. 6 retaining a functional sheet product to a waist member and applying tension in two generally opposing directions.

FIGS. 6 and 8 address an alternative embodiment for applying tension to the functional sheet product 6 in two generally opposing directions by two different lines 4. In the embodiment of FIGS. 6 and 8, lines 4 may apply tension to both the leading end 26 and the second end 28 of the cord 10 to maintain the adjustable loop 32 in the cinched circumference 42. A line 4 may be attached to the second end 28 in the same manners that a line 4 may be attached to the leading end 26 as discussed above. Alternatively, the line 4 and the cord 10 may be one and the same. FIGS. 16 and 23, discussed below, also show tension applied to the cord 10 in two generally opposing directions.

Figure 7:
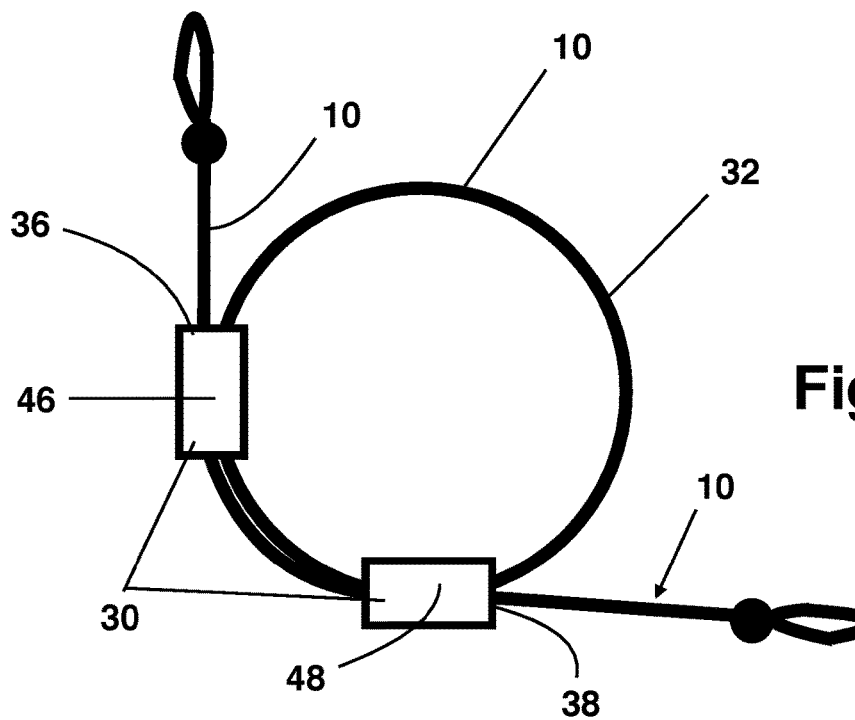
FIG. 7 is a plan view of the cord and two buckles for tension applied in two directions that are not opposing.

FIG. 7 shows an alternative embodiment allowing a single cord 10 to apply tension to the cinching apparatus 2 in two different directions that are not in opposition. In the embodiment of FIG. 7, the buckle 30 is divided into a first buckle 46 and a second buckle 48. The first and second buckles 46, 48 are slideable with respect to each other on the cord 10. The cord 10 extends from the cord second end 28 through the buckle entry opening 37 defined by the first buckle 46, through the second buckle 48 and out the buckle exit opening 39 of the second buckle 48. From the buckle exit opening 39, the cord 10 extends back to the buckle entry opening 37 of the first buckle 46, through the first and the second buckle 46, 48 and out the buckle exit opening 39 to the cord leading end 26. The use of the first and second buckles 46, 48 allows the two cord ends 26, 28 to extend aligned with the buckle channel 34 (buckle channel 34 is shown by FIGS. 4 and 18-22) and to apply tension in two different directions that are not in opposition.

FIGS. 9 and 10 illustrate the use of two separate cords 10 to allow tension to be applied to the cinch connector 2 in three or four different directions. FIG. 10 shows that the cord 10 may be a first cord 50 and a second cord 52. Both the first cord 50 and the second cord 52 pass through the buckle 30, as described above for FIGS. 1, 3-8. The first and second cords 50, 52 define two adjustable loops 32 having a common center. The cord leading end 26 and cord second end 28 the first and second cords 50, 52 may apply tension to the cinching connector 2 in four different directions. FIG. 9 is identical to FIG. 10, except that both the first cord 50 and second cord 52 pass through a first buckle 46 and a second buckle 48. The use of two buckles 46, 48 maintains the shape of the two adjustable loops 32 during installation and relocation of the cinching connector 2. The two cords 50, 52 may include stops 44 as described above with respect to FIGS. 6 and 8, allowing the two cords 50, 52 to apply tension to the cinching apparatus 2 in two or three directions.

Figure 11:
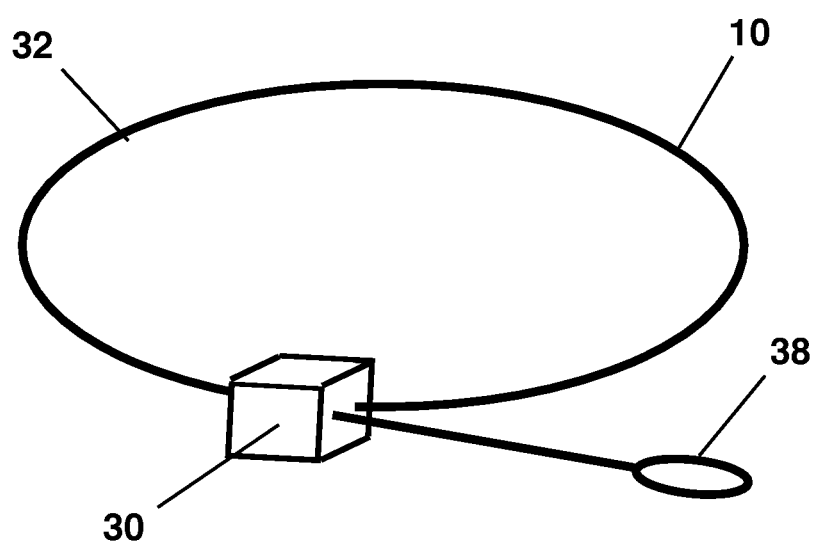
FIG. 11 is a perspective view of an alternative embodiment of the buckle and cord where one end of the cord is affixed to the buckle.
Figure 12:
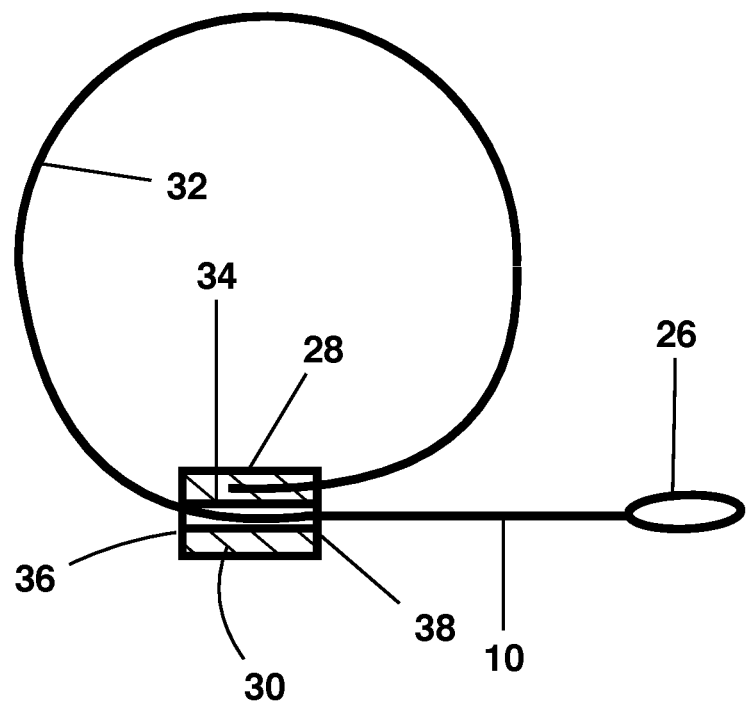
FIG. 12 is a section plan view of the alternative embodiment of FIG. 11.

As shown by FIGS. 11 and 12, the cord second end 28 may be fixed to the buckle 30 and not slideable. The cord 10 may pass through the buckle channel 34 to create the adjustable loop 32. Tension applied to the cord leading end 26 moves the cord 10 between the expanded circumference 40 and the cinched circumference 42. In the embodiment of FIGS. 11 and 12, tension may be applied to the cinching apparatus 2 from only one direction.

Figure 13:
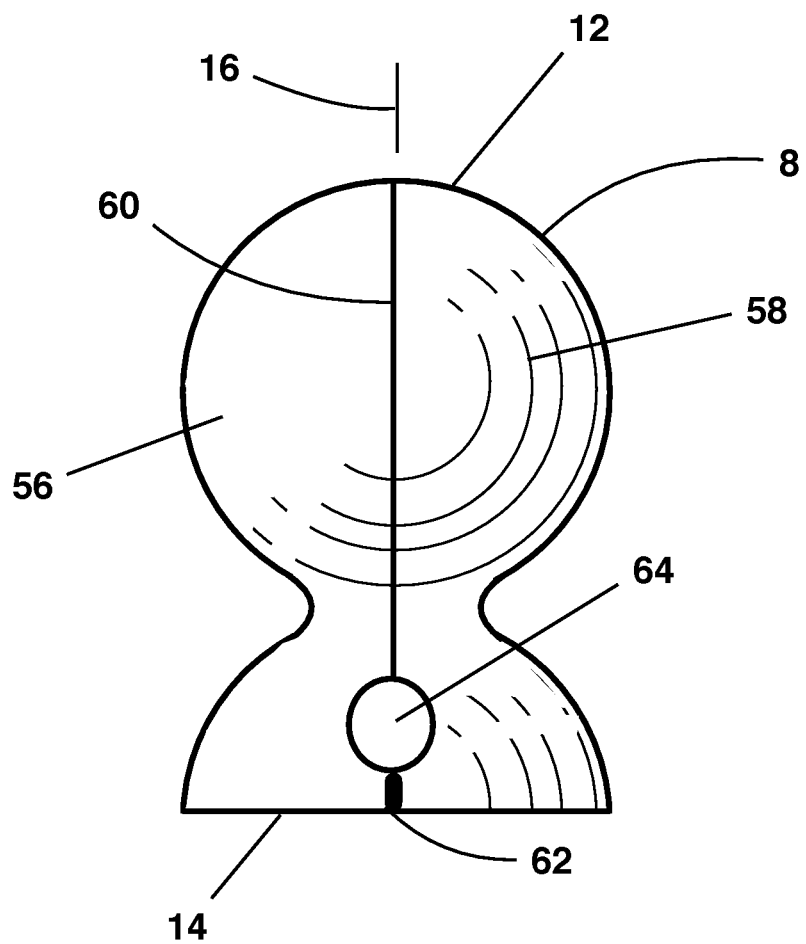
FIG. 13 is a side view of a waist member in a closed position and configured to retain a horizontal support.
Figure 14:
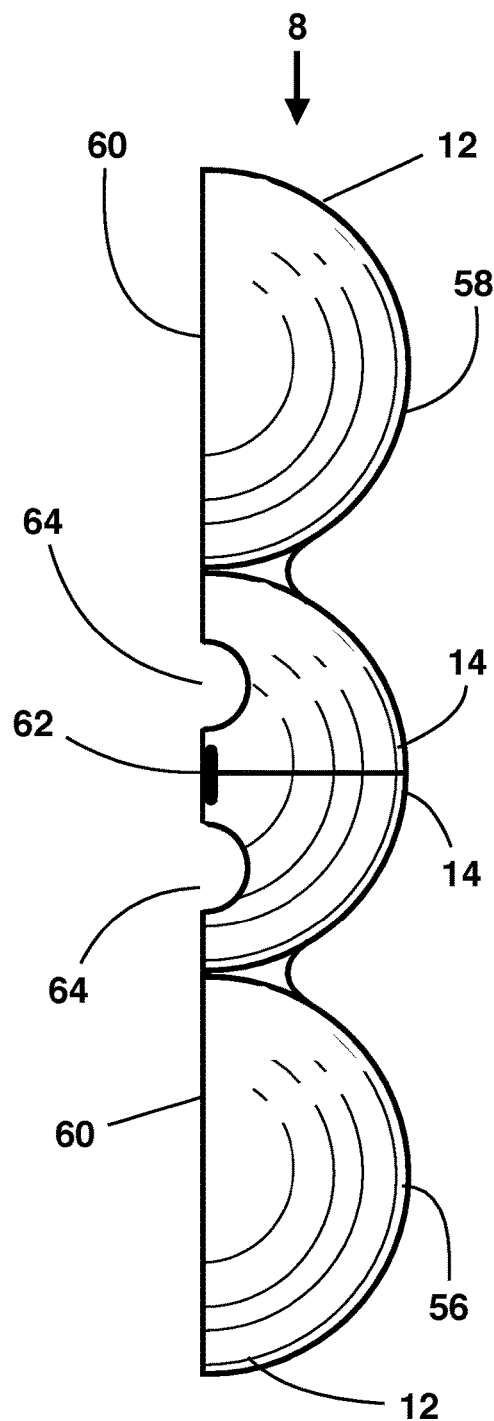
FIG. 14 is a side view of the waist member of FIG. 13 in an open position.
Figure 15:
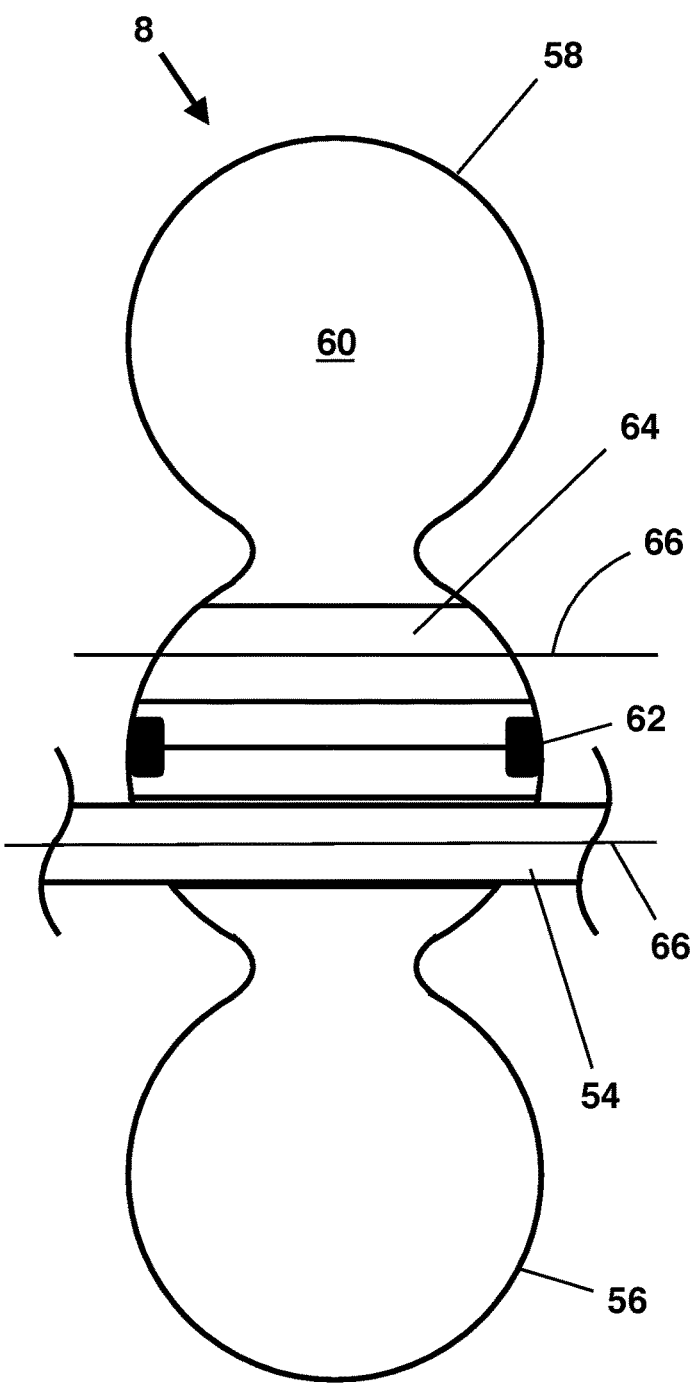
FIG. 15 is a side view of the waist member of FIGS. 13 and 14 in the open position.

FIGS. 13, 14 and 15 address securing a lateral support pole 54 (FIG. 15) to the functional sheet product 6 using the cinching connector apparatus 2. The waist member 8 may be divided into two halves; namely, a left portion 56 and a right portion 58, along a mathematical plane 60 that is coincident with the waist member longitudinal axis 16. A hinge 62 located at the member second end 14 allows the waist member 8 to open and close like a clamshell between a closed position, shown by FIG. 13, and an open position, shown by FIGS. 14 and 15. FIG. 14 is the side view of FIG. 13 with the left and right portions 56, 58 in the open position. FIG. 15 is a view of the inside of the left and right portions 56, 58 in the open position.

From FIGS. 13, 14 and 15, the left and right portions 56, 58 cooperate to define a lateral opening 64. The lateral opening 64 has a lateral opening axis 66 that is coincident with the mathematical plane 60. To install the lateral support pole 54 in the waist member 8, the user will move the left and right portions 56, 58 to the open position and will place the lateral support pole 54 into engagement with the exposed lateral opening 64. The user will then move the left and right portions 56, 58 to the closed position about hinge 62, trapping the lateral support pole 54 in the lateral opening 64. The waist member 8 and trapped lateral support pole 54 then may be secured to the functional sheet product 6 as described above. While FIGS. 13, 14 and 15 show a single waist member 8 comprising left and right portions 56, 58 to trap a lateral support pole 54, two or more waist members 8 may cooperate to trap a single lateral support pole 54 and to attach the lateral support pole 54 to the functional sheet product 6.

FIGS. 16 and 17 illustrate use of the cinching connector apparatus 2 with a longitudinal pole 72, such as a tent pole. FIG. 16 is a detail section view showing the longitudinal pole 72 supporting the waist member 8 and hence the functional sheet product 6. From FIG. 16, the member second end 14 may define a second end longitudinal pole opening 68 that has a second end longitudinal pole axis 70. The second end longitudinal pole axis 70 may be coextensive with the member longitudinal axis 16. The second end longitudinal pole opening 68 is configured to receive a second end longitudinal pole 72. The second end longitudinal pole opening 68 may have any suitable configuration to receive the second end longitudinal pole 72. For example, the second end longitudinal pole opening 68 may be cylindrical, tapered or threaded. The second end longitudinal pole opening may feature a bayonet connection or spring latch to engage the second end longitudinal pole 72.

As shown by the section view of FIG. 17, the waist member 8 may be reversible, with the first end 12 defining a first end longitudinal pole opening 74 having a first end pole opening axis 76. The first end pole opening axis 76 may be coextensive with the member axis 16 and the second end pole opening axis 70. The first end longitudinal pole opening 64 is configured to receive a first end longitudinal pole and may feature the same types of connections as the second longitudinal pole opening 68. The configuration of the first end longitudinal pole opening 74 may be different from the configuration of the second end longitudinal pole opening 68. For example, and as shown in FIG. 17, the second end longitudinal pole opening 68 may be tapered while the first end pole opening 74 is cylindrical. The two openings 68, 74 may accommodate poles 72 of different sizes or shapes. The user may select the end 12, 14 over which to drape the functional sheet product 6 and the opening 68, 74 into which to insert the pole 72 based on the available pole 72.

FIGS. 18 through 22 show embodiments of the buckle 30. FIG. 18 is discussed above relating to FIGS. 1-4 and shows the cord 10 engaging both itself and the buckle 30 in the buckle channel 34. FIG. 19 shows an alternative embodiment in which the buckle channel 34 is two buckle openings 34 and the cord 10 passes through both buckle openings 34 to create the adjustable loop 32. FIG. 20 is a another alternative embodiment in which the buckle entry opening 37 and the buckle exit opening 39 each defines a radius of curvature 78. The radius of curvature 78 causes the buckle entry opening 37 and the buckle exit opening 39 to have a shape similar to that of a trumpet bell. The radius of curvature is equal to or greater than the diameter of the cord 10 passing through the buckle 30. Where the cord is a stranded wire cable, the radiused buckle entry opening and exit opening 37, 39 reduce the fatigue damage of the stranded wire cable from bending at the buckle 30. FIG. 21 shows another alternative embodiment of the buckle 30. In the embodiment of FIG. 21, the buckle 30 is flexible in flexure, allowing the buckle 30 to conform to the shape of the waist 18 when the adjustable loop 32 is in the cinched circumference 42. In the example of FIG. 21, the buckle 30 is a coil spring, but the buckle 30 may be any other structure that is flexible in flexure, such as a resilient polymer tube. FIG. 22 is an end view of a buckle 30 having an adjusting screw 80 to adjust the size of the buckle channel 34. Adjusting the size of the buckle channel 34 allows a user to adjust the friction of the buckle 30 against the cord 10 and of the friction of the cord 10 against itself within the buckle 30 to control the ease of moving the adjustable loop 32 between the expanded circumference 40 and the cinched circumference 42.

FIG. 23 illustrates an alternative embodiment including a retaining member 82. In the alternative embodiment of FIG. 23, the retaining member 82 may be of any shape and is not required to have a waist 18. In the example of FIG. 23, the retaining member 82 is spherical, but the retaining member 82 may be of any shape, including the shapes shown by FIGS. 2 and 5. To secure the retaining member 82 to the functional sheet product 6, the functional sheet product 6 is draped over the retaining member 82. The adjustable loop 34 in the expanded circumference 40 is placed over the retaining member 82. Tension applied to the cord leading end 26, the cord second end 28, or to both moves the adjustable loop 32 to the cinched circumference 42, preventing escape of the retaining member 82 and hence the functional sheet product 6 through the adjustable loop 34. The tension applied by lines 4 to the first and second ends 26, 28 is transferred to the functional sheet product 6.

FIGS. 24 and 25 are section views through an embodiment of the buckle 30 having a single buckle channel 34 communicating between the buckle entry opening 37 on the buckle entry end 36 and the buckle exit opening 39 on the buckle exit end 38. The buckle 30 of FIGS. 24 and 25 is similar to that of FIG. 18, but with the buckle entry opening 37 and exit 39 is chamfered to reduce fatigue of the cord 10 from repeated bending over a sharp corner.

FIG. 26 is a section view of a buckle 30 having two buckle channels 34 communicating through the buckle 30 from the buckle entry opening 37 on the buckle entry end 36 to the buckle exit opening 39 on the buckle exit end 38. FIG. 27 is an end view of the buckle 30 of FIG. 26. The buckle 30 of FIGS. 26 and 27 is similar to the buckle 30 of FIG. 19, but with the buckle entry opening 37 and buckle exit opening 39 chamfered to reduce fatigue on the cord 10.

The cord leading end 26 may include a tensioning apparatus 84 to apply a tension to the cord 10 when the cinching connector apparatus 2 is attached to a first point on a functional sheet product 6 and the cord leading end 26 is attached to a second point, where the second point may be located on the functional sheet product 6 or off of the functional sheet product 6. Any tensioning apparatus 84 for applying a tension to a cord 10 may be suitable, including without limitation a bungee cord or other elastic line, a ratchet strap, a cinching strap including a cinching strap that does not include a ratchet, a pulley, or a block and tackle. Alternatively, the cord 10 may be elastic in the nature of a rubber band or bungee cord.

As used in this document, elements marked on the drawings or in the specification with the same element number have the same meaning in each location in which the element number appears, unless the context requires otherwise. The following are the numbered elements appearing in the specification and shown on the drawings:

A cinching connector apparatus 2
A line 4
a functional sheet product 6
a waist member 8
an elongated cord 10
a member first end 12
member second end 14
a waist member longitudinal axis 16
a waist 18
Member first end circumference 20
Member second end circumference 22

Waist circumference 24
a cord leading end 26
a cord second end 28
a buckle 30
an adjustable loop 32
a buckle channel 34
a buckle entry end 36
a buckle entry opening 37
a buckle exit end 38
a buckle exit opening 39
an expanded circumference 40
A cinched circumference 42
Stop 44
a first buckle 46
a second buckle 48
First cord 50
Second cord 52
a lateral support pole 54
a left portion 56
a right portion 58
a mathematical plane 60
A hinge 62
a lateral opening 64
a lateral opening axis 66
a second end longitudinal pole opening 68
a second end pole opening axis 70
a second end longitudinal pole 72
a first end longitudinal pole opening 74
a first end pole opening axis 76
a radius of curvature 78
Adjusting screw 80
Retaining member 82
Tensioning apparatus 84

I claim:

1. A cinching connector apparatus for applying a tension to a functional sheet product, the cinching connector comprising:
   a) a waist member, the waist member having a member first end and an opposing member second end, the waist member defining a waist member longitudinal axis between the member first end and the member second end, the waist member defining a waist between the member first end and the member second end, each of the member first end, member second end and waist having a circumference, the circumference of the waist being less than the circumference of the member first end and less than the circumference of the member second end;
   b) an elongated cord, the cord having a cord leading end and a cord second end, the cord having a loop between the cord leading end and the cord second end;
   c) a buckle, the buckle having a buckle entry end and an opposing buckle exit end, the buckle having a buckle channel communicating through the buckle from a buckle entry opening on the buckle entry end to a buckle exit opening on the buckle exit end, the cord extending from the cord second end through the buckle entry opening and to the buckle exit opening through the buckle channel, the cord continuing from the buckle exit opening to the buckle entry opening to define the loop, the cord extending from the buckle entry opening and through the buckle channel to the buckle exit opening in a slideable engagement between the cord and the buckle wherein the loop is an adjustable loop, the cord extending from the buckle exit opening to the cord leading end;
   d) wherein the adjustable loop has a configuration to encircle the waist of the waist member and to secure the functional sheet product to the waist member when the functional sheet product is draped about the member first end or member second end and the adjustable loop encircles the functional sheet product at the waist, wherein the configuration of the adjustable loop to encircle the functional sheet product at the waist being that the adjustable loop is movable between an expanded circumference and a cinched circumference, the expanded circumference being greater than the circumference of the member first end or member second end, the cinched circumference being less than the circumference of the member first end and less than the circumference of the member second end, the adjustable loop being configured to move between the expanded circumference and the cinched circumference by a sliding motion of the cord within the buckle channel, wherein the cinching connector apparatus is removable and relocatable without puncturing the functional sheet product.

2. The cinching connector apparatus of claim 1 wherein the member first end is rounded, whereby the functional sheet product does not contact a sharp edge or an abrasive surface of the member first end when the functional sheet product is attached to the waist member by the adjustable loop.

3. The cinching connector apparatus of claim 2 wherein the cord is a stranded wire cable having a polymer coating or wherein the cord is a monofilament polymer and wherein the buckle is composed of a metal or a polymer.

4. A cinching connector apparatus for applying a tension to a functional sheet product, the cinching connector comprising:
   a) a waist member, the waist member having a member first end and an opposing member second end, the waist member defining a waist member longitudinal axis between the member first end and the member second end, the waist member defining a waist between the member first end and the member second end, each of the member first end, member second end and waist having a circumference, the circumference of the waist being less than the circumference of the member first end and less than the circumference of the member second end;
   b) an elongated cord, the cord having a cord leading end and a cord second end, the cord having a loop between the cord leading end and the cord second end;
   c) a buckle, the buckle having a buckle entry end and an opposing buckle exit end, the buckle having a buckle channel communicating through the buckle from a buckle entry opening on the buckle entry end to a buckle exit opening on the buckle exit end, the cord extending from the cord second end through the buckle entry opening and to the buckle exit opening through the buckle channel, the cord continuing from the buckle exit opening to the buckle entry opening to define the loop, the cord extending from the buckle entry opening and through the buckle channel to the buckle exit opening, the cord extending from the buckle exit opening to the cord leading end, wherein the loop has a configuration as an adjustable loop, the adjustable loop has a configuration to encircle the waist of the waist member and to secure the functional sheet product to the waist member when the functional sheet product is draped about the member first end or member second end and the adjustable loop encircles the functional sheet product at the waist wherein the cinching connector apparatus is removable and relocatable without puncturing the functional sheet product wherein a mathematical plane is coincident with the waist member longitudinal axis, the waist member is divided into a left portion and a right portion at the mathematical plane, the left and right portions being joined by a hinge, the hinge being located at the member second end, the left and right portions being configured to move about the hinge in the manner of a clamshell between an open position and a closed position, the left portion and the right portion in the closed position defining the waist member.

5. The cinching connector of claim 4 wherein the waist member defines a lateral opening, the lateral opening having a lateral opening axis, the lateral opening axis intersecting the waist member longitudinal axis when the left and right portions are in the closed position, the lateral opening axis being coincident with the mathematical plane, wherein the lateral opening is configured to receive a lateral support pole when the left and right portions are in the open position and wherein the waist member is configured to retain the lateral support pole when the left and right portions are in the closed position.

6. The cinching connector of claim 1 wherein the cord leading end has a first stop and the cord second end has a second stop, the first stop and second stop are sized so that the cord leading end cannot pass through the buckle channel from the buckle exit end and so that the cord second end cannot pass through the buckle channel from the buckle entry end.

7. The cinching connector of claim 1 wherein the buckle has a configuration to allow the cord leading end and the cord second end to apply the tension to the functional sheet product in two directions, the configuration of the buckle to allow tension in the two directions comprising:
the buckle having a first buckle and a second buckle, the first buckle and second buckle being discrete and separate, the buckle channel communicating through the first buckle and the second buckle, the buckle channel of the first buckle defining the buckle entry opening, the buckle channel of the second buckle defining the buckle exit opening, the cord extending from the cord second end through the buckle entry opening through the first buckle and through the second buckle to the buckle exit opening, the cord continuing from the buckle exit opening in the loop to the buckle entry opening, the cord extending from the buckle entry opening through the buckle channel through the first buckle and the second buckle to the buckle exit opening, the cord continuing from the buckle exit opening to the cord leading end, the first or the second buckle slidable engaging the cord for relative motion between the first and second buckles.

8. The cinching connector of claim 1 wherein the buckle has a configuration to allow the cord leading end and the cord second end to apply the tension to the functional sheet product in two directions wherein the two directions are not in opposition, the configuration of the buckle to allow tension in the two directions comprising:
the buckle being bendable about the waist when the adjustable loop encircles the waist of the waist member.

9. The cinching connector of claim 1 wherein the member second end defines a second end longitudinal pole opening, the second end longitudinal pole opening having a second end pole opening axis, the second end pole opening axis being coextensive with the member longitudinal axis, the second end longitudinal pole opening being configured to receive a second end longitudinal pole.

10. The cinching connector of claim 9 wherein the member first end defines a first end longitudinal pole opening, the first end longitudinal pole opening having a first end pole opening axis, the first end pole opening axis being coextensive with the member longitudinal axis, the first end longitudinal pole opening being configured to receive a first end longitudinal pole, wherein the configuration of the first end longitudinal pole opening to receive the first end longitudinal pole is different from the configuration of the second end longitudinal pole opening to receive the second end longitudinal pole.

11. The cinching connector of claim 1 wherein the elongated cord is a first cord and a second cord, the first cord and second cord each having a cord leading end, the first cord and the second cord each having a cord second end, the first cord and the second cord each having the adjustable loop between the cord leading end and the cord second end, the first cord and the second cord each extending from the cord second end to the buckle entry opening and through the buckle channel to the buckle exit opening, each of the first and second cords extending from the buckle exit opening to the buckle entry opening to define the adjustable loop, each of the first and second cords extending from the adjustable loop through the buckle entry opening and through the buckle channel to the cord leading end of the first cord and second cord, wherein both of the adjustable loops defined by the first cord and second cord has a configuration to encircle the waist of the waist member and to secure the functional sheet product to the waist member when the functional sheet product is draped about the member first end or member second end and both of the first adjustable loop and second adjustable loop encircle the functional sheet product at the waist, whereby the four cord first and second ends may apply the tension to the functional sheet product in four different directions.

12. The cinching connector of claim 1 wherein the cord second end is fixedly attached to the buckle.

13. The cinching connector of claim 1 wherein the buckle entry opening and the buckle exit opening each defines a radius of curvature in a manner of a trumpet bell, the radius of curvature being equal to or greater than a diameter of the cord that passes through the buckle entry opening or buckle exit opening.

14. A method of applying a tension to a functional sheet product, the method comprising the steps of:
a) providing a waist member, the waist member having a member first end and an opposing member second end, the waist member defining a waist member longitudinal axis between the member first end and the member second end, the waist member defining a waist between the member first end and the member second end, each of the member first end, member second end and waist having a circumference, the circumference of the waist being less than the circumference of the member first end and less than the circumference of the member second end;
b) providing an elongated cord, the cord having a cord leading end and a cord second end, cord defining an adjustable loop between the cord leading end and the cord second end;
c) providing a buckle, the buckle having a buckle entry end and an opposing buckle exit end, the buckle having a buckle channel communicating through the buckle from a buckle entry opening on the buckle entry end to a buckle exit opening on the buckle exit end, the cord extending from the cord second end through the buckle entry opening and to the buckle exit opening through the buckle channel, the cord continuing from the buckle exit opening to the buckle entry opening to define the adjustable loop, the cord extending from the buckle entry opening and through the buckle channel to the buckle exit opening, the cord extending from the buckle exit opening to the cord leading end, the adjustable loop being movable between an expanded circumference and a cinched circumference by a slidable engagement between the cord and and the buckle, the expanded circumference being greater than the circumference of the member first end, the cinched circumference being less than the circumference of the member first end and less than the circumference of the member second end, the adjustable loop being configured to move from the expanded circumference to the cinched circumference by the tension applied to the cord leading end;

d) wrapping the functional sheet product about the member first end;

e) placing the adjustable loop in the expanded circumference over the functional sheet product at the member first end so that the adjustable loop encircles the functional sheet product and the waist member;

f) moving the adjustable loop from the expanded circumference to the cinched circumference by applying the tension to the cord leading end, whereby the adjustable loop retains the functional sheet product to the waist member.

15. The method of claim 14 wherein the waist member is divided by a mathematical plane coincident with the waist member longitudinal axis, the mathematical plane dividing the waist member into a left portion and a right portion, the left and right portions being joined by a hinge, the hinge being located at the second end of the waist member, the left portion and right portion being configured to move in the manner of a clamshell between an open position and a closed position, the left portion and the right portion in the closed position defining the waist member, the waist member defining a lateral opening configured to receive a lateral support pole, the lateral opening having a lateral opening axis, the lateral opening axis intersecting the waist member longitudinal axis when the left and right portions are in the closed position, the lateral opening axis being coincident with the mathematical plane, the method further comprising:

a. moving the left and right portions to the open position;

b. placing the lateral support pole into engagement with the lateral opening;

c. moving the left and right portions to the closed position and trapping the lateral support pole within the waist member.

16. The method of claim 14 wherein the member second end defines a second end longitudinal pole opening, the second end longitudinal pole opening having a second end longitudinal pole opening axis, the second end longitudinal pole opening axis being coextensive with the waist member longitudinal axis, the second end longitudinal pole opening being configured to receive a second end longitudinal pole, wherein the method further comprises: placing the second end longitudinal pole into engagement with the second end longitudinal pole opening.

17. The method of claim 16 wherein the configuration of the second end longitudinal pole opening to receive the second end longitudinal pole being that the second end longitudinal pole opening is cylindrical, threaded, tapered, or that the second end longitudinal pole opening has a bayonet connection or a spring latch configured to retain the second end longitudinal pole.

18. A cinching connector apparatus for applying a tension to a functional sheet product, the cinching connector comprising:

a) a retaining member having a retaining member circumference;

b) an elongated cord, the cord having a cord leading end, the cord having a cord second end, the cord having a loop between the cord leading end and the cord second end;

c) a buckle, the buckle defining a buckle channel communicating through the buckle, the buckle channel having a buckle entry opening and a buckle exit opening, the cord extending from the cord second end through the buckle entry opening and to the buckle exit opening, the cord continuing from the buckle exit opening to the buckle entry opening to define the loop, the cord extending from the loop through the buckle entry opening and through the buckle exit opening to the cord leading end, the cord disposed within the buckle channel slideably engaging the buckle so that the loop is an adjustable loop;

d. wherein the adjustable loop has a configuration to encircle the retaining member and to secure the functional sheet product to the retaining member when the functional sheet product is draped about the retaining member and the adjustable loop encircles the functional sheet product over the retaining member, wherein the configuration of the adjustable loop to encircle the functional sheet product at the retaining member being that the adjustable loop is movable between an expanded circumference and a cinched circumference, the expanded circumference being greater than the circumference of the retaining member, the cinched circumference being less than the circumference of the retaining member, the adjustable loop being configured to move between the expanded circumference and the cinched circumference by a sliding motion of the cord within the buckle channel wherein the cinching connector apparatus is removable and relocatable without puncturing the functional sheet product.

19. The cinching connector apparatus of claim 1 wherein the cord leading end comprises: a tensioning apparatus configured to apply a tension to the cord between the cord leading end and the buckle exit opening when the cinching connector is attached to a first point on the functional sheet product and the cord leading end is attached to a second point, the second point being on the functional sheet product or separate from the functional sheet product.

20. The cinching connector apparatus of claim 19 wherein the tensioning apparatus comprises a cinching strap or a ratchet strap, or wherein the tensioning apparatus comprises an elastic line in a nature of a bungee cord or a rubber band, or wherein the cord is elastic in the nature of the rubber band or the bungee cord.

21. The cinching connector apparatus of claim 1 wherein the cord frictionally engages the buckle to provide resistance to the movement of the adjustable loop between the cinched circumference and the expanded circumference, whereby the adjustable loop will move from the expanded circumference to the cinched circumference when a tension is applied to the cord and whereby the frictional engagement of the cord and the buckle prevents the adjustable loop from moving from the cinched circumference to the expanded circumference when the tension on the cord is released.

* * * * *